(12) United States Patent
Liu et al.

(10) Patent No.: US 12,426,084 B2
(45) Date of Patent: Sep. 23, 2025

(54) CHANNEL OCCUPANCY TIME CONTENTION GRANT FOR SIDELINK COMMUNICATIONS

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 17/449,945

(22) Filed: Oct. 4, 2021

(65) Prior Publication Data

US 2023/0109449 A1    Apr. 6, 2023

(51) Int. Cl.
*H04W 72/40* (2023.01)
*H04W 4/10* (2009.01)
*H04W 72/25* (2023.01)
*H04W 74/0808* (2024.01)
*H04W 76/45* (2018.01)

(52) U.S. Cl.
CPC ......... *H04W 74/0808* (2013.01); *H04W 4/10* (2013.01); *H04W 72/25* (2023.01); *H04W 72/40* (2023.01); *H04W 76/45* (2018.02)

(58) Field of Classification Search
CPC ......... H04W 74/0808; H04W 72/0446; H04W 72/21; H04W 72/40; H04W 72/25; H04W 28/26; H04W 4/10; H04W 4/025; H04W 76/45; H04L 29/06442
See application file for complete search history.

(56) References Cited

U.S. PATENT DOCUMENTS

| | | | | |
|---|---|---|---|---|
| 2017/0318607 | A1* | 11/2017 | Tiirola | H04W 4/10 |
| 2019/0230706 | A1* | 7/2019 | Li | H04B 7/0695 |
| 2019/0254047 | A1* | 8/2019 | Ahmed | H04W 28/0231 |
| 2019/0363843 | A1* | 11/2019 | Gordaychik | H04L 1/08 |
| 2020/0008238 | A1* | 1/2020 | Huang | H04W 74/0808 |

(Continued)

FOREIGN PATENT DOCUMENTS

| | | | | |
|---|---|---|---|---|
| WO | WO-2021/110088 | * | 12/2019 | H04W 72/12 |
| WO | WO-2021110088 A1 | * | 6/2021 | H04L 27/2607 |

OTHER PUBLICATIONS

U.S. Appl. No. 63/086,281, Park et al., "Transmission Configuration Indicator Configuration" Oct. 1, 2020 (Year: 2020).*

(Continued)

*Primary Examiner* — Salvador E Rivas

(74) *Attorney, Agent, or Firm* — Haynes and Boone LLP

(57) ABSTRACT

Wireless communications systems and methods related to communicating control information are provided. A method of wireless communication performed by a sidelink user equipment (UE) may include receiving, from a base station (BS), a configuration indicating a listen-before-talk (LBT) window, wherein the configuration indicates a start and an end associated with the LBT window, performing, during the LBT window, an LBT for a channel occupancy time (COT) in a shared radio frequency band, and transmitting, to another sidelink UE, based on the LBT being successful, one or more transport blocks (TBs) during the COT.

30 Claims, 9 Drawing Sheets

(56) References Cited

U.S. PATENT DOCUMENTS

| | | | |
|---|---|---|---|
| 2020/0205195 A1* | 6/2020 | Sun | H04W 74/0808 |
| 2021/0120580 A1* | 4/2021 | Tsai | H04W 74/006 |
| 2021/0144743 A1* | 5/2021 | Rastegardoost | H04W 72/23 |
| 2021/0274553 A1* | 9/2021 | Xue | H04W 56/0015 |
| 2021/0298080 A1* | 9/2021 | Wu | H04W 74/006 |
| 2022/0131725 A1* | 4/2022 | Li | H04L 27/0006 |
| 2022/0159724 A1* | 5/2022 | Fan | H04L 5/0094 |
| 2022/0167407 A1* | 5/2022 | Oviedo | H04W 74/0808 |
| 2022/0174720 A1* | 6/2022 | Yang | H04W 72/23 |
| 2022/0217543 A1* | 7/2022 | Murayama | H04L 5/0044 |
| 2022/0377683 A1* | 11/2022 | Myung | H04W 74/0816 |
| 2023/0136327 A1* | 5/2023 | Lin | H04L 5/0094 370/330 |
| 2023/0136864 A1* | 5/2023 | Lei | H04L 5/0055 370/329 |
| 2023/0146718 A1* | 5/2023 | Lei | H04L 1/1607 370/329 |
| 2023/0232481 A1* | 7/2023 | Park | H04L 5/0055 370/329 |
| 2023/0254073 A1* | 8/2023 | Jia | H04L 1/1854 370/329 |
| 2023/0269769 A1* | 8/2023 | Ganesan | H04W 74/0808 370/328 |
| 2023/0345532 A1* | 10/2023 | Khirallah | H04W 74/0816 |
| 2024/0147533 A1* | 5/2024 | Zhang | H04W 74/0808 |

OTHER PUBLICATIONS

ETSI, "TS 136 321 version 16.5.0", Sep. 2021, pp. 1-144 (Year: 2021).*

* cited by examiner

900

Transmit, by a base station (BS), to a user equipment (UE), a configuration indicating a listen-before-talk (LBT) window that indicates a start and an end associated with the LBT window and a channel occupancy time (COT) in a shared radio frequency band — 910

FIG. 9

CHANNEL OCCUPANCY TIME CONTENTION GRANT FOR SIDELINK COMMUNICATIONS

TECHNICAL FIELD

This application relates to wireless communication systems, and more particularly, to methods and devices for wireless communication using channel occupancy time contention grants in physical sidelink channels.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a sidelink user equipment (UE) may include receiving, from a base station (BS), a configuration indicating a listen-before-talk (LBT) window, wherein the configuration indicates a start and an end associated with the LBT window; performing, during the LBT window, an LBT for a channel occupancy time (COT) in a shared radio frequency band; and transmitting, to another sidelink UE, based on the LBT being successful, one or more transport blocks (TBs) during the COT.

In an additional aspect of the disclosure, a method of wireless communication performed by a base station (BS) may include transmitting, to a user equipment (UE), a configuration indicating a listen-before-talk (LBT) window that indicates a start and an end associated with the LBT window and a channel occupancy time (COT) in a shared radio frequency band.

In an additional aspect of the disclosure, a user equipment (UE) may include a memory; a transceiver; and at least one processor coupled to the memory and the transceiver, wherein the UE is configured to receive, from a base station (BS), a configuration indicating a listen-before-talk (LBT) window, wherein the configuration indicates a start and an end associated with the LBT window; perform, during the LBT window, an LBT for a channel occupancy time (COT) in a shared radio frequency band; and transmit, to another UE, based on the LBT being successful, one or more transport blocks (TBs) during the COT.

In an additional aspect of the disclosure, a base station (BS) may include a memory; a transceiver; and at least one processor coupled to the memory and the transceiver, wherein the BS is configured to transmit, to a user equipment (UE), a configuration indicating a listen-before-talk (LBT) window that indicates a start and an end associated with the LBT window and a channel occupancy time (COT) in a shared radio frequency band.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

BRIEF DESCRIPTION OF THE DRAWINGS

FIG. 9 is a flow diagram of a communication method according to some aspects of the present disclosure.

DETAILED DESCRIPTION

Figure 1:
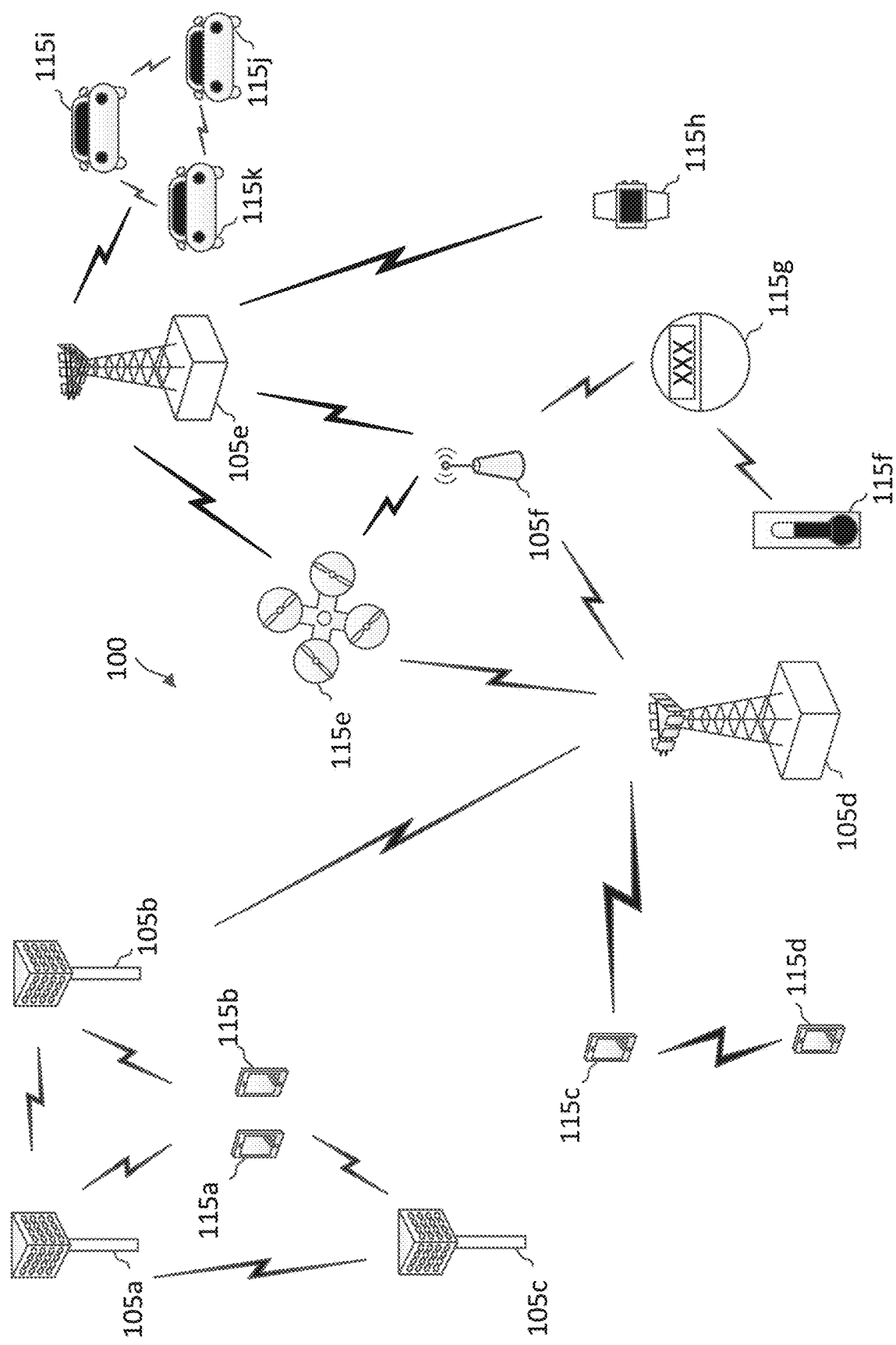
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for a UE (e.g., a sidelink UE) to receive a resource grant from a BS to contend for a COT. The UE may operate in a sidelink mode 1 in which the UE is in communication with the BS in order to receive the resource grant in a configuration from the BS. The configuration may include a look-before-talk (LBT) window. The LBT window may be a time period in which the UE may perform an LBT to gain a channel occupancy time (COT) in which the UE may transmit data (e.g., transmit data in a transport block). As a result of the UE contending for the COT by performing one or more LBT(s) within an LBT window time period, the wireless network may reduce control traffic and latency as compared to the UE reporting a HARQ process to the BS and requesting a DCI grant from the BS each time an LBT is performed unsuccessfully. In this regard, in some instances the BS may refrain from scheduling the transmission of each TB, thereby reducing network traffic, including reducing PUCCH communications. Wireless communication applications requiring low latency and high reliability such as vehicle-to-everything (V2X) and industrial Internet-of-things (IoT) may benefit from the methods and devices of the present disclosure.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a vehicle (e.g., a car, a truck, a bus, an autonomous vehicle, an aircraft, a boat, etc.). Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some aspects, the UE 115g (e.g., a meter, a programmable logic controller, an IoT device, a robot, a vehicle, a smartphone, etc.) may receive a configuration indicating a listen-before-talk (LBT) window from the BS 105. The configuration may indicate a start and/or an end associated with the LBT window. In this regard, the UE 115g may receive the configuration from the BS 105 in a downlink control information (DCI) message (e.g., a DCI3 message). The UE 115 may receive the configuration via a physical downlink control channel (PDCCH), a physical broadcast channel (PBCH), a physical downlink shared channel (PDSCH), or other suitable channel. The UE 115 may operate in a sidelink mode 1 in which the UE 115 is in communication with the BS 105 in order to receive the configuration from the BS 105. The LBT window may be a time period in which the UE 115 may perform an LBT to gain a channel occupancy time (COT) in which the UE 115 may transmit data (e.g., transmit data in a transport block) to another UE (e.g., the UE 115f). As a result of the UE 115 contending for the COT by performing one or more LBT(s) within an LBT window time period, the wireless network 100 may reduce control traffic and latency as compared to the UE 115 reporting a HARQ process to the BS 105 and requesting a DCI grant from the BS 105 each time an LBT is performed unsuccessfully. In this regard, in some instances the BS 105 may refrain from scheduling the transmission of each TB, thereby reducing network traffic, including reducing PUCCH communications.

Figure 2:
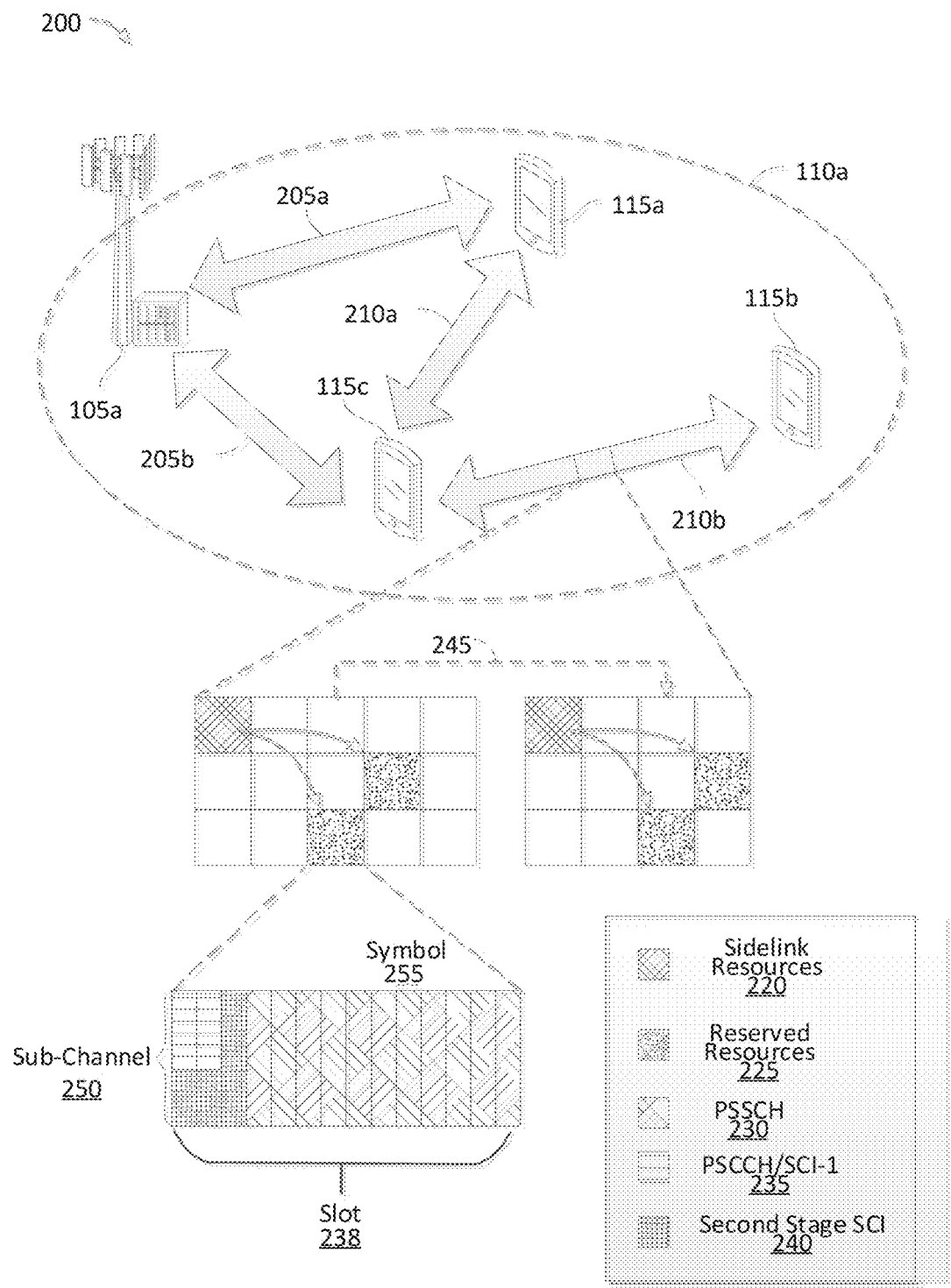
FIG. 2 illustrates a sidelink wireless communication network according to some aspects of the present disclosure.

FIG. 2 illustrates sidelink resources associated with a wireless communication network 200 according to some aspects of the present disclosure. The wireless communications network 200 may include a base station 105a and UEs 115a, 115b, and 115c, which may be examples of a BS 105 and a UE 115 as described with reference to FIG. 1. Base station 105a and UEs 115a and 115c may communicate within geographic coverage area 110a and via communication links 205a and 205b, respectively. UE 115c may communicate with UEs 115a and 115b via sidelink communication links 210a and 210b, respectively. In some examples, UE 115c may transmit SCI to UEs 115a and 115b via the sidelink control resources 220. The SCI may include an indication of resources reserved for retransmissions by UE 115c (e.g., the reserved resources 225). In some examples, UEs 115a and 115b may determine to reuse one or more of the reserved resources 225.

In some aspects, a device in the wireless communication network 200 (e.g., a UE 115, a BS 105, or some other node) may convey SCI to another device (e.g., another UE 115, a BS 105, sidelink device or vehicle-to-everything (V2X) device, or other node). The SCI may be conveyed in one or more stages. The first stage SCI may be carried on the PSCCH while the second stage SCI may be carried on the corresponding PSSCH. For example, UE 115c may transmit a PSCCH/first stage SCI 235 (e.g., SCI-1) to each sidelink UE 115 in the network (e.g., UEs 115a and 115b) via the sidelink communication links 210. The PSCCH/first stage SCI-1 235 may indicate resources that are reserved by UE 115c for retransmissions (e.g., the SCI-1 may indicate the reserved resources 225 for retransmissions). Each sidelink UE 115 may decode the first stage SCI-1 to determine where the reserved resources 225 are located (e.g., to refrain from using resources that are reserved for another sidelink transmission and/or to reduce resource collision within the wireless communications network 200). Sidelink communication may include a mode 1 operation in which the UEs 115 are in a coverage area of BS 105a. In mode 1, the UEs 115 may receive a configured grant from the BS 105a that defines parameters for the UEs 115 to access the channel. Sidelink communication may also include a mode 2 operation in which the UEs 115 operate autonomously from the BS 105a and perform sensing of the channel to gain access to the channel. In some aspects, during mode 2 sidelink operations, the sidelink UEs 115 may perform channel sensing to locate resources reserved by other sidelink transmissions. The first stage SCI-1 may reduce the need for sensing each channel. For example, the first stage SCI-1 may include an explicit indication such that the UEs 115 may refrain from blindly decoding each channel. The first stage SCI-1 may be transmitted via the sidelink control resources 220. The sidelink control resources 220 may be configured resources (e.g., time resources or frequency resources) transmitted via a PSCCH 235. In some examples, the PSCCH 235 may be configured to occupy a number of physical resource blocks (PRBs) within a selected frequency. The frequency may include a single subchannel 250 (e.g., 10, 12, 15, 20, 25, or some other number of RBs within the subchannel 250). The time duration of the PSCCH 235 may be configured by the BS 105a (e.g., the PSCCH 235 may span 1, 2, 3, or some other number of symbols 255).

The first stage SCI-1 may include one or more fields to indicate a location of the reserved resources 225. For example, the first stage SCI-1 may include, without limitation, one or more fields to convey a frequency domain resource allocation (FDRA), a time domain resource allocation (TDRA), a resource reservation period 245 (e.g., a period for repeating the SCI transmission and the corresponding reserved resources 225), a modulation and coding scheme (MCS) for a second stage SCI-2 240, a beta offset value for the second stage SCI-2 240, a DMRS port (e.g., one bit indicating a number of data layers), a physical sidelink feedback channel (PSFCH) overhead indicator, a priority, one or more additional reserved bits, or a combination thereof. The beta offset may indicate the coding rate for transmitting the second stage SCI-2 240. The beta offset may indicate an offset to the MCS index. The MCS may be indicated by an index ranging from 0 to 31. For example, if the MCS is set at index 16 indicating a modulation order of 4 and a coding rate of 378, the beta offset may indicate a value of 2 thereby setting the coding rate to 490 based on an MCS index of 18. In some examples, the FDRA may be a number of bits in the first stage SCI-1 that may indicate a number of slots 238 and a number of subchannels reserved for the reserved resources 225 (e.g., a receiving UE 115 may determine a location of the reserved resources 225 based on the FDRA by using the subchannel 250 including the PSCCH 235 and first stage SCI-1 as a reference). The TDRA may be a number of bits in the first stage SCI-1 (e.g., 5 bits, 9 bits, or some other number of bits) that may indicate a number of time resources reserved for the reserved resources 225. In this regard, the first stage SCI-1 may indicate the reserved resources 225 to the one or more sidelink UEs 115 in the wireless communication network 200.

In some aspects, the UE 115c may receive a configuration indicating a listen-before-talk (LBT) window from the BS 105a. The configuration may indicate a start and/or an end associated with the LBT window. In this regard, the UE 115c may receive the configuration from the BS 105 in a downlink control information (DCI) message (e.g., a DCI3 message) via communications link 205b. The UE 115c may receive the configuration via a physical downlink control channel (PDCCH), a physical broadcast channel (PBCH), a physical downlink shared channel (PDSCH), or other suitable channel. The UE 115c may operate in a sidelink mode 1 in which the UE 115c is in communication with the BS 105a in order to receive the configuration from the BS 105a. The LBT window may be a time period in which the UE 115c may perform an LBT to gain a channel occupancy time (COT) in which the UE 115c may transmit data (e.g., transmit data in a transport block) to another UE (e.g., the UE 115b via communications link 210b). As a result of the UE 115c contending for the COT by performing one or more LBT(s) within an LBT window time period, the wireless network 200 may reduce control traffic and latency as compared to the UE 115c reporting a HARQ process to the BS 105a and requesting a DCI grant from the BS 105a each time an LBT is performed unsuccessfully. In this regard, in some instances the BS 105a may refrain from scheduling the transmission of each TB, thereby reducing network traffic, including reducing PUCCH communications.

Figure 3:
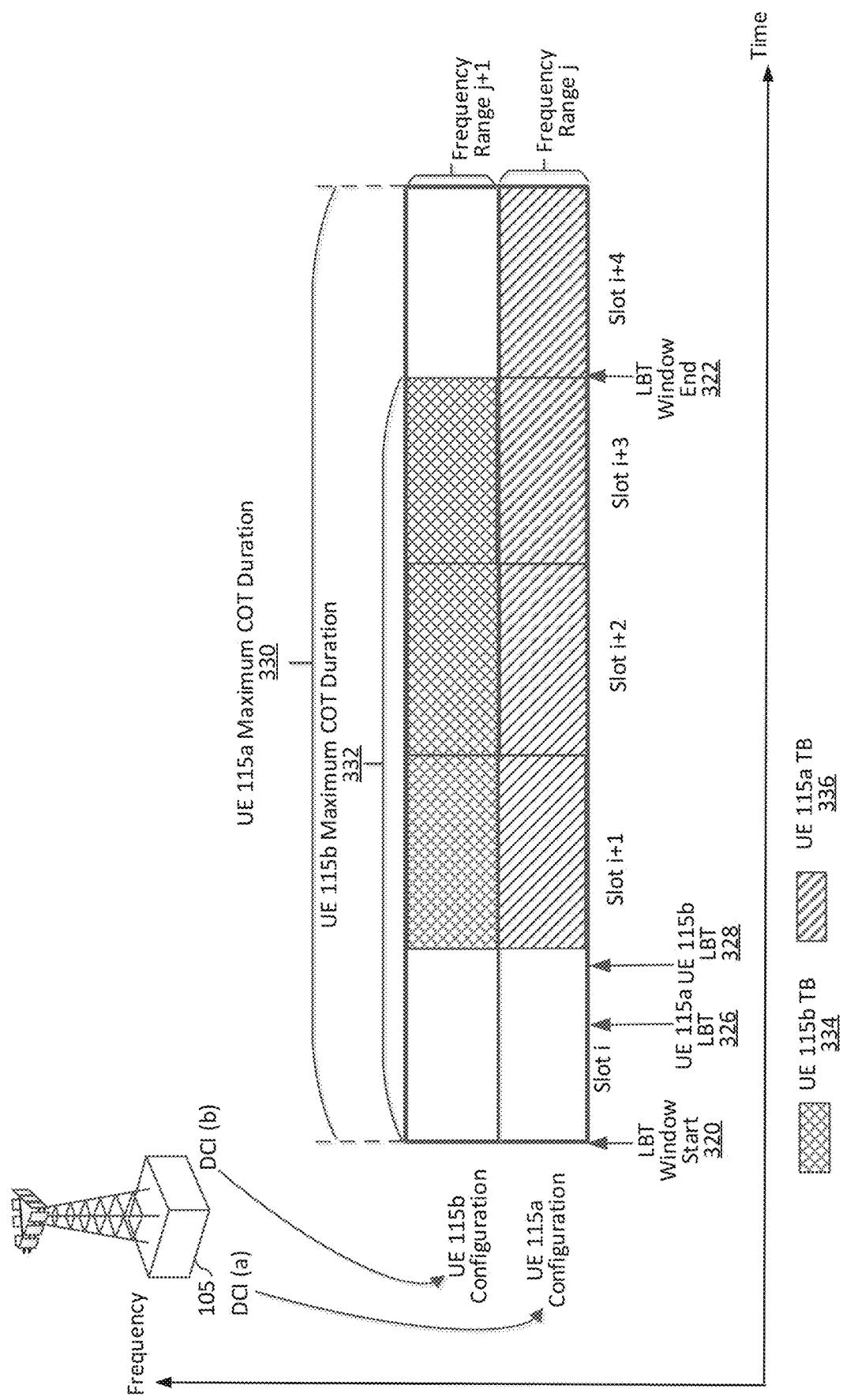
FIG. 3 illustrates resources granted for COT contention according to some aspects of the present disclosure.

FIG. 3 illustrates resources granted for COT contention according to some aspects of the present disclosure. In FIG. 3, the x-axis represents time in some arbitrary units and the y-axis represents frequency in some arbitrary units. In some aspects, a UE 115a may receive a configuration indicating a listen-before-talk (LBT) window from a BS 105. A UE 115b may receive a configuration indicating a listen-before-talk (LBT) window from the BS 105. The UE 115b may receive the same configuration as the UE 115a or a different configuration as the UE 115a. The configuration may indicate an LBT window start 320 and an LBT window end 322. In this regard, the UE 115 may receive the configuration from the BS 105 in a downlink control information (DCI) message (e.g., a DCI3 message). The UE 115 may receive the configuration via a physical downlink control channel (PDCCH), a physical broadcast channel (PBCH), a physical downlink shared channel (PDSCH), or other suitable channel. The UE 115 may operate in a sidelink mode 1 in which the UE 115 is in communication with the BS 105 in order to receive the configuration from the BS 105. The LBT window may be a time period between the LBT window start 320 and the LBT window end 322 in which the UE 115 may perform an LBT to gain a channel occupancy time (COT) in which the UE 115 may transmit data (e.g., transmit data in a transport block). As a result of the UE 115 contending for the COT by performing one or more LBT(s) within an LBT window time period, the wireless network (e.g., wireless network 100, 200) may reduce control traffic and latency as compared to the UE 115 reporting a HARQ process to the BS 105 and requesting a DCI grant from the BS 105 each time an LBT is performed unsuccessfully. In this regard, the BS 105 may refrain from scheduling the transmission of each TB, thereby reducing network traffic, including reducing PUCCH communications.

In some aspects, the LBT window start 320 may be indicated in the configuration by a pointer. The pointer for the LBT window start 320 may be to a starting slot i or a starting sub-slot. In some aspects, a slot (e.g., slot i, slot i+1, etc.) may be partitioned into sub-slots. A sub-slot may include a number of symbols (e.g., contiguous symbols) within the slot. For example, a sub-slot may include 1, 2, 3, 4, 5, or more symbols within the slot. Although the example of FIG. 3 shows the configuration on a slot basis, the present disclosure is not so limited and the configuration may be on a sub-slot basis.

The pointer for the start of the LBT window may be a slot index (e.g., slot i) or a sub-slot index that indicates the LBT window start 320. In some instances, the pointer for the LBT window start 320 may be indicated relative to a slot that includes the configuration (e.g., a slot prior to slot i). For example, the pointer for the LBT window start 320 may be indicated by an index relative to a slot carrying a DCI message (e.g., a unicast DCI3 message and/or a groupcast DCI3 message) that includes the configuration.

In some aspects, the LBT window end 322 may also be indicated in the configuration by a pointer. The pointer for the LBT window end 322 may be to an ending slot or an ending sub-slot. The pointer for the LBT window end 322 may be to slot index i+4 or a sub-slot index that points to the ending sub-slot of the LBT window. The pointer for the LBT window end 322 may be indicated by an index relative to the starting slot i or the starting sub-slot of the LBT window. For example, the LBT window end 322 may be indicated as a number of slots or sub-slots after the LBT window start 320.

In some aspects, the UE 115 may receive the configuration from the BS 105 in a shared radio frequency band. The configuration may include a frequency domain resource allocation (FDRA) that indicates at least one frequency range in the shared radio frequency band. For example, UE 115a may be configured to communicate in frequency range j. The UE 115b may be configured to communicate in frequency range j+1. A shared radio frequency band may include a licensed radio frequency band and/or an unlicensed radio frequency band. The unlicensed radio frequency band may include a 2.4 GHz band, a 3.5 GHz band, a 5 GHz band, a 6 GHZ band, a 37 GHz band, an FR2 band, an FR2x band, a frequency band in the range of about 60 GHz to about 71 GHz, and/or other unlicensed frequency band. In some instances, the UE 115 may receive the configuration from the BS 105 in a licensed radio frequency band. In order to reduce signaling overhead in the wireless network (e.g., the wireless network 100 or 200), the configuration may not include parameters including new data indicator (NDI), hybrid automatic repeat request process identification (HARQ ID), the K1 offset between the DL slot where the data is scheduled on PDSCH and the UL slot where the HARQ ACK/NACK feedback for the scheduled PDSCH data, and PUCCH resource indicator (PRI).

In some aspects, the configuration may be based on a topology of a wireless network (e.g., wireless network 100 or 200) that includes at least the UE 115a, the UE 115b, and the BS 105. The topology of the network may include information associated with the relative positions and/or absolute positions of the UE 115a, the UE 115b, and the BS 105. The BS 105 may determine the topology of the network using any suitable method. For example, the BS 105 may receive information from the UE 115a and/or the UE 115b indicating their absolute position in the network. The UE 115a and/or the UE 115b may determine their position based on a global navigation satellite system (GNSS) and transmit the position to the BS 105. In some aspects, the BS 105 may use beamforming techniques, radio frequency triangulation, received signal strength indicators, and/or other suitable position determining methods to determine the network topology. The BS 105 may generate LBT window configurations for the UE 115a and/or the UE 115b based on the relative position of the UE 115a with respect to the UE 115b. For example, the BS 105 may generate configurations with overlapping (e.g., common) resources for the UE 115a and the UE 115*b* that are separated by a distance by which the transmissions of the UE 115*a* and/or the UE 115*b* are unlikely to interfere with one another. In some aspects, the BS 105 may generate configurations with non-overlapping (e.g., separate) resources for the UE 115*a* and the UE 115*b* when the UE 115*a* and the UE 115*b* are in close proximity to each other so that their respective transmissions do not interfere with one another.

In some aspects, the configuration includes a maximum COT duration 330, 332. The maximum COT duration 330 assigned to UE 115*a* may extend past the LBT window end 322. The maximum COT duration 332 assigned to UE 115*b* may be approximately equal to the LBT window between the LBT window start 320 and the LBT window end 322. The configuration may further indicate resources associated with the COT durations 330, 332. In this regard, the configuration may include time/frequency resources signaled via a DCI3 message. The time resources may be indicated in a time domain resource allocation (TDRA). The frequency resources may be indicated in a frequency domain resource allocation (FDRA). The configuration may include a start and an end associated with the COT durations 330, 332. For example, the configuration for UE 115*a* may include an indicator indicating a starting slot i and an ending slot i+4 associated with the maximum COT duration 330. The configuration for UE 115*b* may include an indicator indicating a starting slot i and an ending slot i+3 associated with the maximum COT duration 332.

In some aspects, the UE 115*a* may transmit a TB(s) 336 during the maximum COT duration 330 after performing a successful LBT at LBT 326. The TB(s) 336 may be transmitted in slots i+1, i+2, i+3, and i+4, based on the amount of data to be transmitted in the TB(s) 336. In some aspects, the UE 115*b* may transmit a TB(s) 334 during the maximum COT duration 332 after performing a successful LBT at LBT 328. The TB(s) 334 may be transmitted in slots i+1, i+2, and i+3, based on the amount of data to be transmitted in the TB(s) 334. In some aspects, the UE 115*a* may perform a successful LBT at LBT 326 and block the UE 115*b* from performing a successful LBT at LBT 328.

Figure 4:
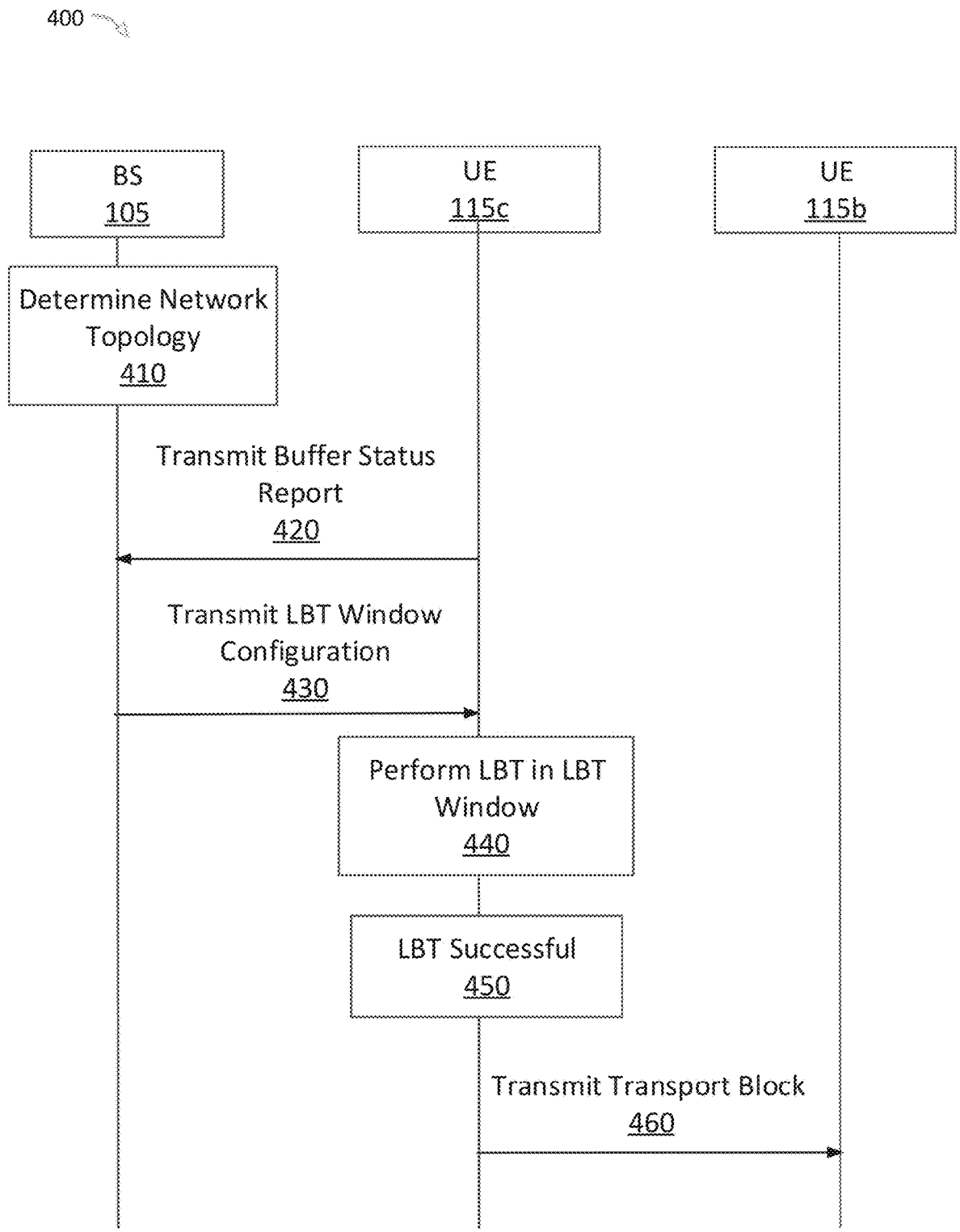
FIG. 4 is a signaling diagram of a communication method according to some aspects of the present disclosure.

FIG. 4 is a signaling diagram of a communication method according to some aspects of the present disclosure. Actions of the signaling diagram 400 can be executed by a computing device (e.g., a processor, processing circuit, and/or other suitable component) of a communication device or other suitable means for performing the actions. For example, a communication device, such as the UE 115 or the UE 600, may utilize one or more components, such as a processor 602, a memory 604, instructions 606, a COT contention grant module 608, a transceiver 610, a modem 612, an RF unit 614, and one or more antennas 616 to execute the actions of signaling diagram 400. A communication device, such as the BS 105 or the BS 700, may utilize one or more components, such as a processor 702, a memory 704, instructions 706, a COT contention grant module 708, a transceiver 710, a modem 712, an RF unit 714, and one or more antennas 716 to execute the actions of signaling diagram 400.

At action 410, the method 400 includes a BS 105 determining a network topology of a wireless network (e.g., wireless network 100 or 200) that includes at least the UE 115*b*, the UE 115*c* and the BS 105. The topology of the network may include information associated with the relative positions and/or absolute positions of the UE 115*b*, the UE 115*c*, and the BS 105. The BS 105 may determine the topology of the network using any suitable method. For example, the BS 105 may receive information from the UE 115*b* and/or the UE 115*c* indicating their absolute position in the network. The UE 115*b* and/or the UE 115*c* may determine their position based on a global navigation satellite system (GNSS) and transmit the position to the BS 105. In some aspects, the BS 105 may use beamforming techniques, radio frequency triangulation, received signal strength indicators, and/or other suitable position determining methods to determine the network topology. The BS 105 may generate LBT window configurations for the UE 115*c* based on the relative position of the UE 115*c* with respect to the UE 115*b* and/or with respect to other UEs 115 in the network.

At action 420, the method 400 includes the UE 115*c* transmitting a buffer status report to the BS 105. In some aspects, the COT duration may be based on an amount of data the UE 115*c* needs to transmit in TB(s) to the UE 115*b* and/or other UEs 115. A larger amount of data may require a longer COT duration as compared to a smaller amount of data. The amount of data to be transmitted by the UE 115*c* may be indicated to the BS 105 by the UE 115*c*. In some instances, the UE 115*c* may indicate the amount of data to be transmitted in a buffer status report (BSR). In this regard, the UE 115*c* may transmit the BSR to the BS 105 in a physical uplink control channel (PUCCH) and/or a physical uplink shared channel (PUSCH).

At action 430, the method 400 includes the BS 105 transmitting the LBT window configuration to the UE 115*c*. The BS 105 may transmit the LBT window configuration to the UE 115*c* in a DCI3 message. In this regard, the BS 105 may transmit the LBT window configuration to the UE 115*c* via a physical downlink control channel (PDCCH), a physical broadcast channel (PBCH), a physical downlink shared channel (PDSCH), or other suitable channel. The LBT window configuration may include the parameters described above with reference to FIG. 3 including, without limitation, a maximum COT duration. The maximum COT duration may be based on the BSR received from the UE 115*c* at action 420. The configuration may further indicate resources including time/frequency resources signaled via the DCI3 message. The time resources may be indicated in a time domain resource allocation (TDRA). The frequency resources may be indicated in a frequency domain resource allocation (FDRA). The configuration may include a start and an end associated with the COT. For example, the configuration may include an indicator indicating a starting slot and/or sub-slot associated with the COT duration. The configuration may include an indicator indicating an ending slot and/or sub-slot associated with the COT duration. The start and end indicators of the COT duration may include slot indexes and/or sub-slot indexes. The configuration may include the type of LBT (e.g., a frame-based equipment (FBE)-based LBT and/or a load-based equipment (LBE)-based LBT), the category of LBT (e.g., CAT2-LBT and/or CAT4-LBT), and at least one direction (e.g., a beam direction) associated with the LBT. In order to reduce signaling overhead in the wireless network, the configuration may not include parameters including new data indicator (NDI), hybrid automatic repeat request process identification (HARQ ID), the K1 offset between the DL slot where the data is scheduled on PDSCH and the UL slot where the HARQ ACK/NACK feedback for the scheduled PDSCH data, and PUCCH resource indicator (PRI).

At action 440, the method 400 includes the UE 115*c* performing an LBT within the time period indicated by the LBT window configuration. The UE 115*c* may perform the LBT for a COT in a shared radio frequency band during the LBT window. In this regard, the UE 115*c* may the perform the LBT for the COT in at least one frequency range in the shared radio frequency band. In some aspects, the at least one frequency range in the shared radio frequency band includes a plurality of contiguous frequencies in the shared radio frequency band. For example, the contiguous frequencies may include multiple subchannels that are contiguous over a range of frequencies. The configuration may include an indicator (e.g., a bitmap) indicating which frequencies the UE 115c may perform the LBT in the shared radio frequency band. In some aspects, the BS 105 may configure multiple UEs 115 with the same and/or different frequency ranges to perform an LBT. In some aspects, the frequency ranges for each of the UEs 115 may be contiguous. In some aspects, the frequency ranges for the UEs 115 may be interleaved with one another. For example, the UE 115c may be configured with frequency ranges having even indexes and the UE 115b may be configured with frequency ranges having odd indexes. However, any type or arrangement of interleaving of frequencies may be utilized. In some aspects, the BS 105 may configure (e.g., assign) overlapping time and/or frequency resources to the UE 115c and the UE 115b. Each of the UE 115c and the UE 115b assigned with the overlapping time and/or frequency resources may compete for the COT by performing an LBT in the overlapping resources. In some instances, the BS 105 may limit the number of UEs 115 configured with overlapping resources in order to increase the probability of the UEs 115 to gain access to the COT. The UE 115c may first sense the communications channel during the LBT window to determine if there are other devices using the channel prior to any transmission by the UE 115c. In some aspects, the channel sensing procedure may rely on detecting energy levels on one or multiple sub-bands of the shared radio frequency band. The UE 115c may perform the LBT in one or more beam direction(s) (e.g., 1, 2, 4, 8, 16, or more beam directions). In some instances, the beam direction(s) may be towards the UE 115b (e.g., another sidelink UE) that the UE 115c intends to communicate with. The UE 115c may configure its receiver to the specific beam direction and perform the LBT in the specific beam direction.

At action 450, the method 400 includes the UE 115c determining that the LBT performed at action 440 was successful. For example, the UE 115c may determine that the detected energy levels on one or multiple sub-bands of the shared radio frequency band is below a threshold. In some aspects, the UE 115c may determine that the detected energy levels in one or more beam direction(s) towards the UE 115b is below a threshold.

At action 460, the method 400 includes the UE 115c transmitting, based on the LBT being successful, one or more transport blocks (TBs) to the UE 115b during the COT. In this regard, the UE 115c may transmit the TB(s) to the UE 115b in a physical sidelink shared channel (PSSCH). The UE 115c may transmit the TB(s) to the UE 115b in at least one beam direction that has successfully cleared the LBT. In some aspects, the UE 115c may transmit the one or more TBs based on the configuration received from the BS 105. For example, the UE 115c may transmit the one or more TBs to the UE 115b based on a start and/or an end associated with the LBT window, a frequency domain resource allocation (FDRA) that indicates at least one frequency range in the shared radio frequency band, a topology of a wireless network (e.g., wireless network 100 or 200) that includes at least the BS 105, the UE 115c, and the UE 115c, the type of LBT, and the COT duration. In some aspects, the UE 115b and the UE 115c may execute a HARQ process for the potential retransmission of the TB.

Figure 5:
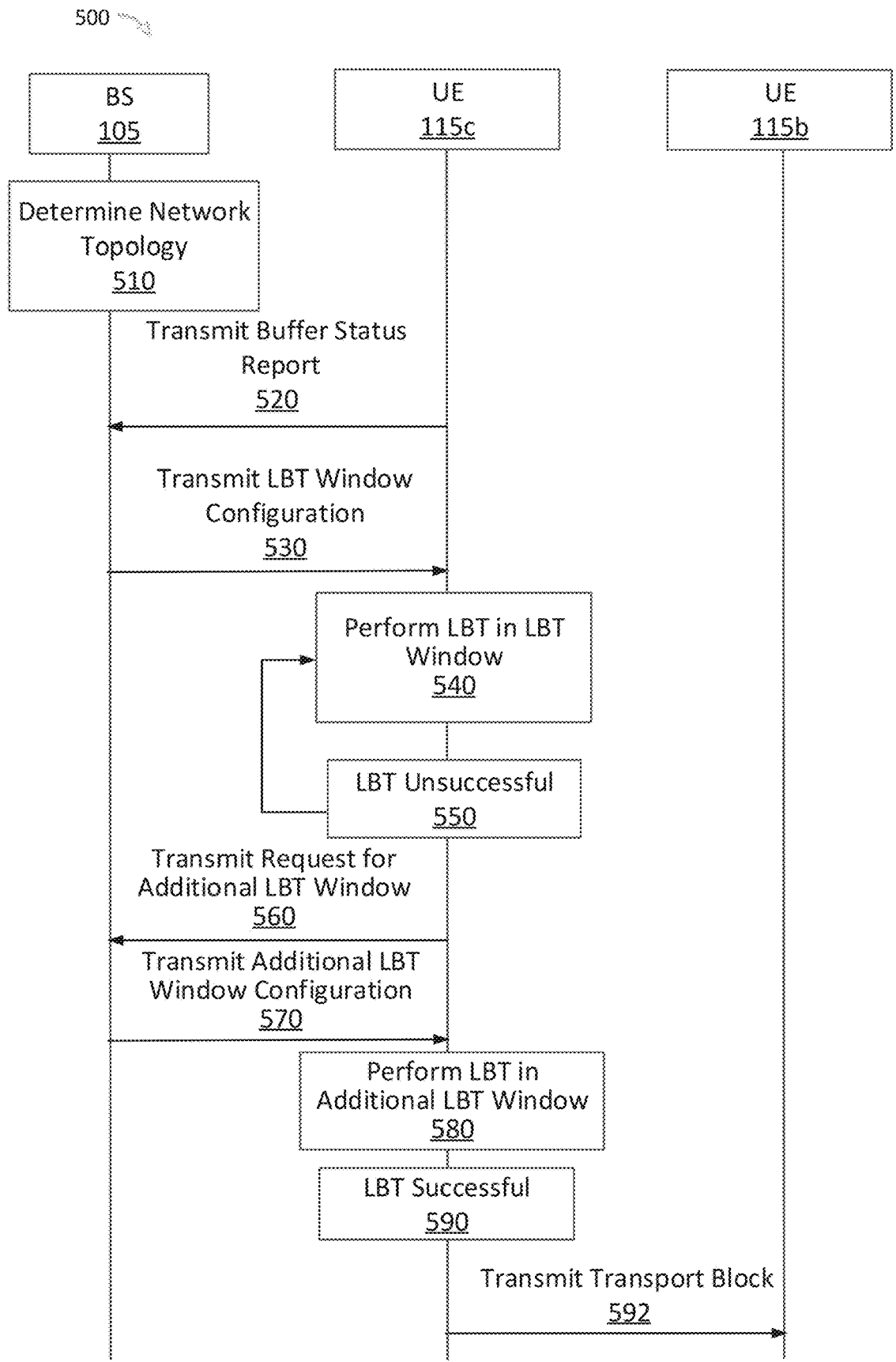
FIG. 5 is a signaling diagram of a communication method according to some aspects of the present disclosure.

FIG. 5 is a signaling diagram of a communication method according to some aspects of the present disclosure. Actions of the method 500 can be executed by a computing device (e.g., a processor, processing circuit, and/or other suitable component) of a communication device or other suitable means for performing the actions. For example, a communication device, such as the UE 115 or the UE 600, may utilize one or more components, such as a processor 602, a memory 604, instructions 606, a COT contention grant module 608, a transceiver 610, a modem 612, an RF unit 614, and one or more antennas 616 to execute the actions of method 500. A communication device, such as the BS 105 or the BS 700, may utilize one or more components, such as a processor 702, a memory 704, instructions 706, a COT contention grant module 708, a transceiver 710, a modem 712, an RF unit 714, and one or more antennas 716 to execute the actions of method 500.

At action 510, the method 500 includes a BS 105 determining a network topology of a wireless network (e.g., wireless network 100 or 200) that includes at least the UE 115b, the UE 115c and the BS 105. The topology of the network may include information associated with the relative positions and/or absolute positions of the UE 115b, the UE 115c, and the BS 105. The BS 105 may determine the topology of the network using any suitable method including the methods described above with reference to action 410 of FIG. 4. The BS 105 may generate LBT window configurations for the UE 115c based on the network topology.

At action 520, the method 500 includes the UE 115c transmitting a buffer status report to the BS 105. In some aspects, the COT duration may be based on an amount of data the UE 115c needs to transmit in TB(s) to the UE 115b and/or other UEs 115. The amount of data to be transmitted by the UE 115c may be indicated to the BS 105 by the UE 115c. In some instances, the UE 115c indicates the amount of data to be transmitted in a buffer status report (BSR). In this regard, the UE 115c may transmit the BSR to the BS 105 in a physical uplink control channel (PUCCH) and/or a physical uplink shared channel (PUSCH).

At action 530, the method 500 includes the BS 105 transmitting the LBT window configuration to the UE 115c. The BS 105 may transmit the LBT window configuration to the UE 115c in a DCI3 message. In this regard, the BS 105 may transmit the LBT window configuration to the UE 115c via a physical downlink control channel (PDCCH), a physical broadcast channel (PBCH), a physical downlink shared channel (PDSCH), or other suitable channel. The LBT window configuration may include the parameters described above with reference to action 430 of FIG. 4.

At action 540, the method 500 includes the UE 115c performing an LBT within the time period indicated by the LBT window configuration. The UE 115c may perform the LBT for a COT in a shared radio frequency band during the LBT window. In this regard, the UE 115c may the perform the LBT for the COT in at least one frequency range in the shared radio frequency band as described above with reference to action 440 of FIG. 4

At action 550, the method 500 includes the UE 115c determining the LBT performed at action 540 was unsuccessful. The UE 115c may perform an unsuccessful LBT by sensing the energy in the channel and determining the sensed energy is above a threshold. In response to determining the LBT performed at action 540 was unsuccessful, the UE 115c may wait a period of time (e.g., a random back-off time period, a pre-configured back-off time period). The method 500 may return to action 540 after an unsuccessful LBT and after waiting the period of time. After returning to action 540, the UE 115c may perform another LBT. The sequence of determining an unsuccessful LBT at action 550, waiting the period of time, and returning to action 540 may be performed multiple times during the LBT window.

At action 560, the method 500 includes the UE 115c transmitting a request for an additional LBT window. If the UE 115c does not perform a successful LBT during the LBT window, the UE 115c may transmit a message to the BS 105 indicating the LBT was not successful and request another configuration for an additional LBT window. The UE 115c may transmit the message indicating the LBT was not successful and requesting another configuration for an additional LBT window via a physical uplink control channel (PUCCH), a physical uplink shared channel (PUSCH), or other suitable channel. In some aspects, the actions 540, 550, and 560 may be repeated multiple times based on an unsuccessful LBT during the LBT window.

At action 570, the method 500 includes the BS 105 transmitting an additional LBT window configuration. In response to the request at action 560, the BS 105 may transmit another LBT window configuration indicating, without limitation, the LBT window, the LBT parameters, and the COT duration.

At action 580, the method 500 includes the UE 115c performing another LBT within the time period indicated by the additional LBT window configuration. The UE 115c may perform another LBT as described with reference to action 540.

At action 590, the method 500 includes the UE 115c determining that the additional LBT performed at action 580 was successful. For example, the UE 115c may determine that the detected energy levels on one or multiple sub-bands of the shared radio frequency band is below a threshold. In some aspects, the UE 115c may determine that the detected energy levels in one or more beam direction(s) towards the UE 115b is below a threshold.

At action 592, the method 500 includes the UE 115c transmitting, based on the additional LBT being successful, one or more transport blocks (TBs) to the UE 115b during the COT. In this regard, the UE 115c may transmit the TB(s) to the UE 115b in a physical sidelink shared channel (PSSCH). The UE 115c may transmit the TB(s) to the UE 115b in at least one beam direction that has successfully cleared the LBT. In some aspects, the UE 115c may transmit the one or more TBs based on the configuration received from the BS 105. In some aspects, the UE 115b and the UE 115c may execute a HARQ process for the potential retransmission of the TB.

Figure 6:
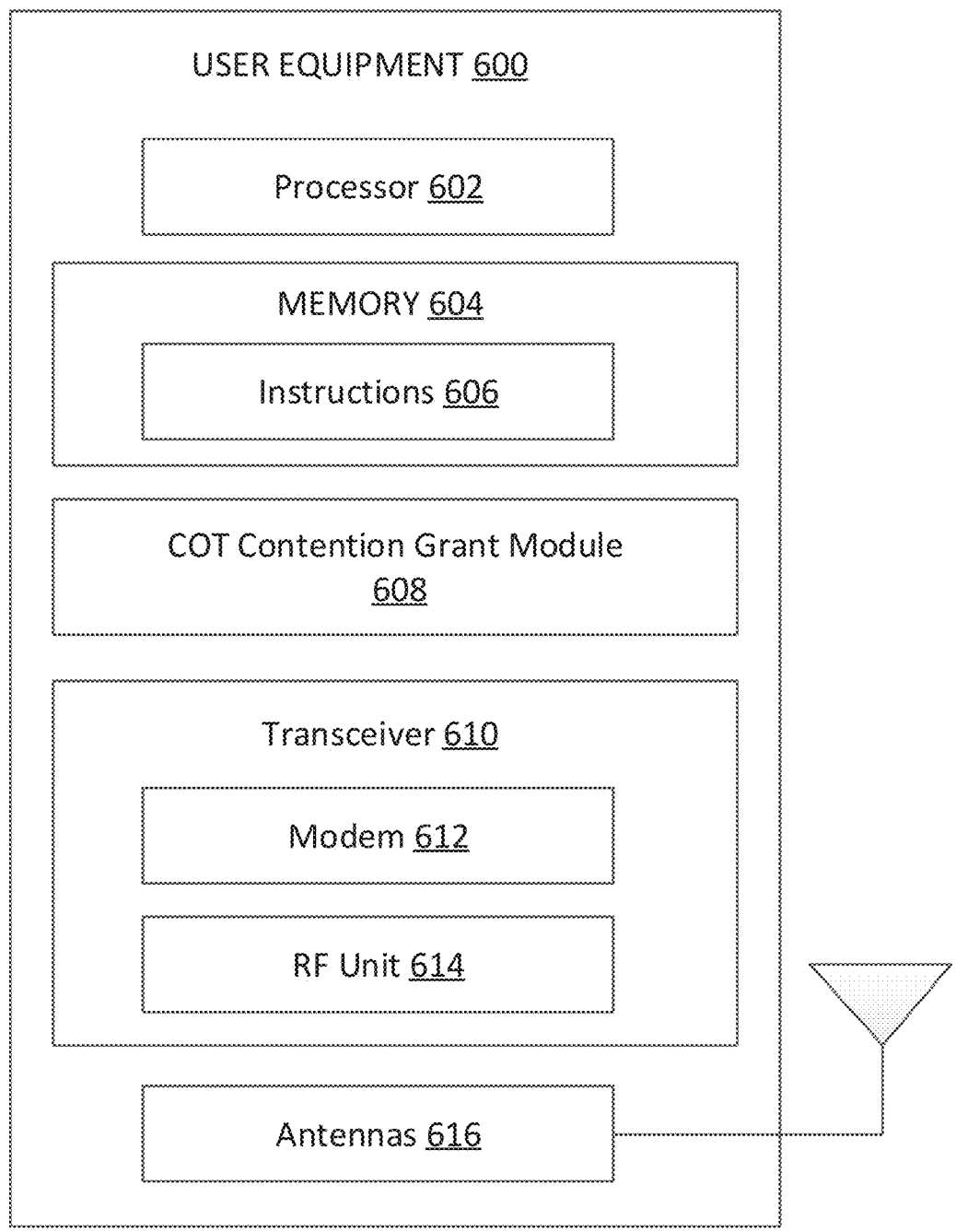
FIG. 6 is a block diagram of an exemplary user equipment (UE) according to some aspects of the present disclosure.

FIG. 6 is a block diagram of an exemplary UE 600 according to some aspects of the present disclosure. The UE 600 may be the UE 115 in the network 100 or 200 as discussed above. The UE 600 may be a sidelink UE. As shown, the UE 600 may include a processor 602, a memory 604, a COT contention grant module 608, a transceiver 610 including a modem subsystem 612 and a radio frequency (RF) unit 614, and one or more antennas 616. These elements may be coupled with each other and in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with aspects of the present disclosure, for example, aspects of FIGS. 2-5 and 8-9. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The COT contention grant module 608 may be implemented via hardware, software, or combinations thereof. For example, the COT contention grant module 608 may be implemented as a processor, circuit, and/or instructions 606 stored in the memory 604 and executed by the processor 602.

The COT contention grant module 608 may be used for various aspects of the present disclosure, for example, aspects of FIGS. 2-5 and 8-9. The COT contention grant module 608 is configured to receive a configuration indicating a listen-before-talk (LBT) window from a BS (e.g., the BS 105, the BS 700). The configuration may indicate a start and an end associated with the LBT window. The COT contention grant module 608 is further configured to perform, during the LBT window, an LBT for a channel occupancy time (COT) in a shared radio frequency band. The COT contention grant module 608 is further configured to transmit, based on the LBT being successful, one or more transport blocks (TBs) during the COT to another sidelink UE.

As shown, the transceiver 610 may include the modem subsystem 612 and the RF unit 614. The transceiver 610 can be configured to communicate bi-directionally with other devices, such as the BSs 105 and/or the UEs 115. The modem subsystem 612 may be configured to modulate and/or encode the data from the memory 604 and the COT contention grant module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In some instances, the UE 600 can include multiple transceivers 610 implementing different RATs (e.g., NR and LTE). In some instances, the UE 600 can include a single transceiver 610 implementing multiple RATs (e.g., NR and LTE). In some instances, the transceiver 610 can include various components, where different combinations of components can implement RATs.

In some aspects, the processor 602 may be coupled to the memory 604, the COT contention grant module 608, and/or the transceiver 610. The processor 602 and may execute operating system (OS) code stored in the memory 604 in order to control and/or coordinate operations of the COT contention grant module 608 and/or the transceiver 610. In some aspects, the processor 602 may be implemented as part of the COT contention grant module 608.

Figure 7:
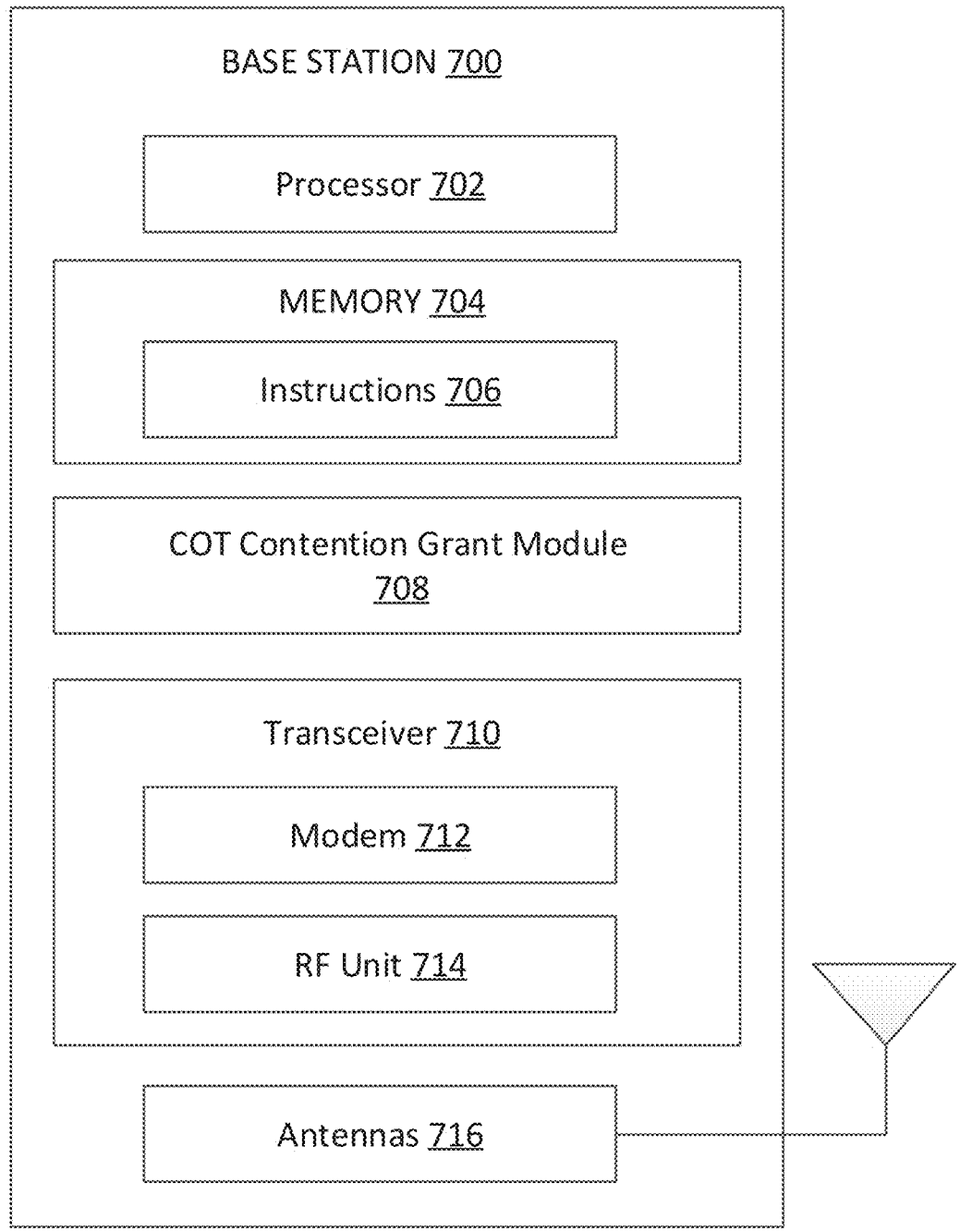
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 as discussed above. As shown, the BS 700 may include a processor 702, a memory 704, a COT contention grant module 708, a transceiver 710 including a modem subsystem 712 and a RF unit 714, and one or more antennas 716. These elements may be coupled with each other and in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 2-5 and 8-9. Instructions 706 may also be referred to as code, which may be interpreted broadly to include any type of computer-readable statement(s).

The COT contention grant module 708 may be implemented via hardware, software, or combinations thereof. For example, the COT contention grant module 708 may be implemented as a processor, circuit, and/or instructions 706 stored in the memory 704 and executed by the processor 702.

The COT contention grant module 708 may be used for various aspects of the present disclosure, for example, aspects of FIGS. 2-5 and 8-9. The COT contention grant module 708 is configured to transmit a configuration to a UE indicating a listen-before-talk (LBT) window that indicates a start and an end associated with the LBT window and a channel occupancy time (COT) in a shared radio frequency band.

Additionally or alternatively, the COT contention grant module 708 can be implemented in any combination of hardware and software, and may, in some implementations, involve, for example, processor 702, memory 704, instructions 706, transceiver 710, and/or modem 712.

As shown, the transceiver 710 may include the modem subsystem 712 and the RF unit 714. The transceiver 710 can be configured to communicate bi-directionally with other devices, such as the UEs 115 and/or 700. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 700 to enable the BS 700 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, a configuration indicating a plurality of sub-slots within a slot according to aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In some instances, the BS 700 can include multiple transceivers 710 implementing different RATs (e.g., NR and LTE). In some instances, the BS 700 can include a single transceiver 710 implementing multiple RATs (e.g., NR and LTE). In some instances, the transceiver 710 can include various components, where different combinations of components can implement RATs.

In some aspects, the processor 702 may be coupled to the memory 704, the COT contention grant module 708, and/or the transceiver 710. The processor 702 may execute OS code stored in the memory 704 to control and/or coordinate operations of the COT contention grant module 708, and/or the transceiver 710. In some aspects, the processor 702 may be implemented as part of the COT contention grant module 708. In some aspects, the processor 702 is configured to transmit via the transceiver 710, to a UE, an indicator indicating a configuration of sub-slots within a slot.

Figure 8:
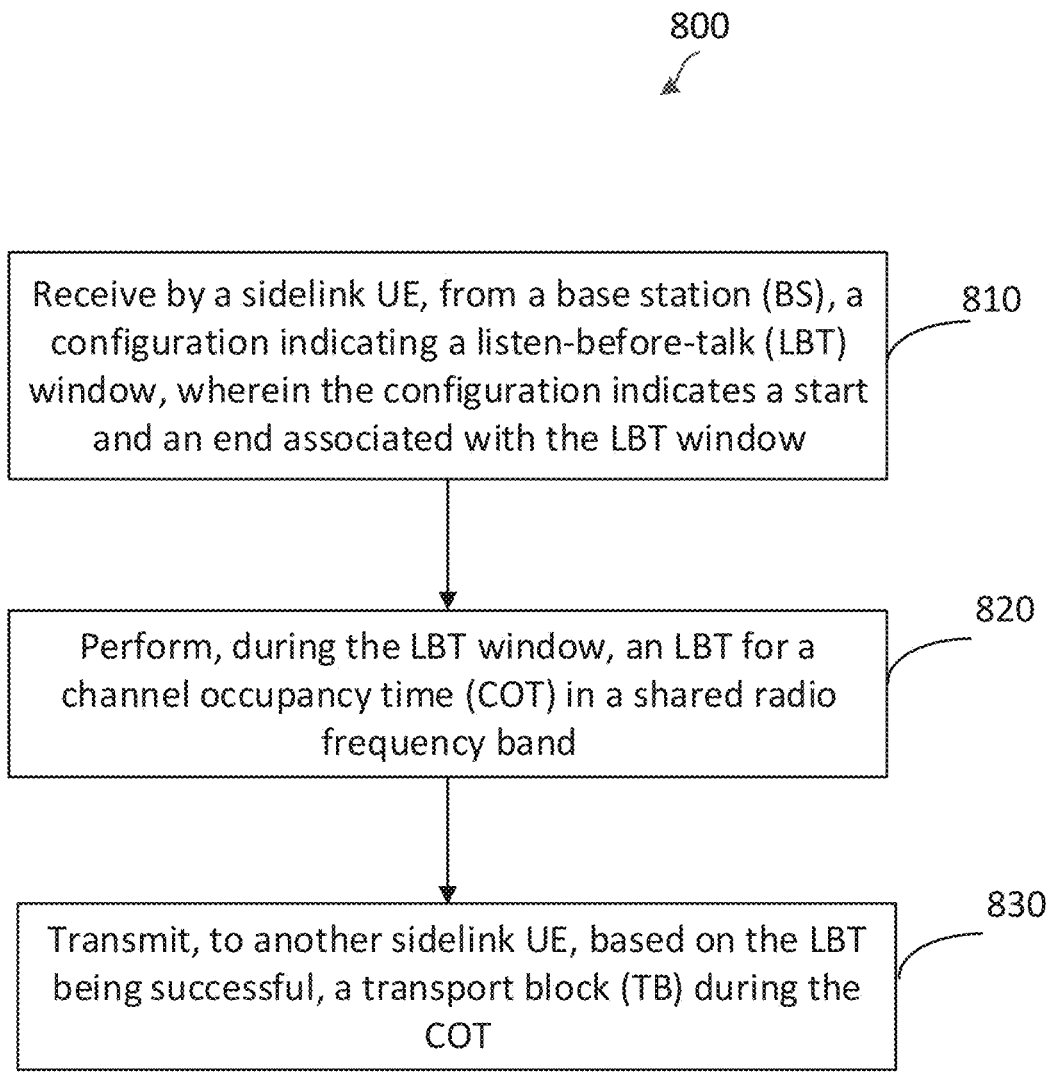
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the actions. For example, a wireless communication device, such as the UE 115, UE 215 or UE 600, may utilize one or more components, such as the processor 602, the memory 604, the COT contention grant module 608, the transceiver 610, the modem 612, and the one or more antennas 616, to execute aspects of method 800. The method 800 may employ similar mechanisms as in the networks 100 and 200 and the aspects and actions described with respect to FIGS. 2-5. As illustrated, the method 800 includes a number of enumerated actions, but the method 800 may include additional actions before, after, and in between the enumerated actions. In some aspects, one or more of the enumerated actions may be omitted or performed in a different order.

At action 810, the method 800 includes a UE (e.g., the UE 115, the sidelink UE 215, or the UE 600) receiving a configuration indicating a listen-before-talk (LBT) window from a base station (BS). The configuration may indicate a start and/or an end associated with the LBT window. In this regard, the UE may receive the configuration from the BS in a downlink control information (DCI) message (e.g., a DCI3 message). The UE may receive the configuration via a physical downlink control channel (PDCCH), a physical broadcast channel (PBCH), a physical downlink shared channel (PDSCH), or other suitable channel. The UE may operate in a sidelink mode 1 in which the UE is in communication with the BS in order to receive the configuration from the BS in the DCI message. The LBT window may be a time period in which the UE may perform an LBT to gain a channel occupancy time (COT) in which the UE may transmit data (e.g., transmit data in a transport block). As a result of the UE contending for the COT by performing one or more LBT(s) within an LBT window time period, the wireless network (e.g., wireless network 100, 200) may reduce control traffic and latency as compared to the UE reporting a HARQ process to the BS and requesting a DCI grant from the BS each time an LBT is performed unsuccessfully. In this regard, in some instances the BS may refrain from scheduling the transmission of each TB, thereby reducing network traffic, including reducing PUCCH communications.

In some aspects, the start associated with the LBT window may be indicated in the configuration by a pointer. The pointer for the start of the LBT window may be to a starting slot or a starting sub-slot. In some aspects, a slot may be partitioned into sub-slots. A sub-slot may include a number of symbols (e.g., contiguous symbols) within the slot. For example, a sub-slot may include 1, 2, 3, 4, 5, or more symbols within the slot.

The pointer for the start of the LBT window may be a slot index or a sub-slot index that indicates the starting slot or starting sub-slot of the LBT window. In some instances, pointer for the start of the LBT window may be indicated relative to a slot that includes the configuration. For example, the pointer for the start of the LBT window may be indicated by an index relative to a slot carrying a DCI message (e.g., a unicast DCI3 message and/or a groupcast DCI3 message) that includes the configuration.

In some aspects, the end associated with the LBT window may also be indicated in the configuration by a pointer. The pointer for the end of the LBT window may be to an ending slot or an ending sub-slot. The pointer for the end of the LBT window may be a slot index or sub-slot index that points to the ending slot or ending sub-slot of the LBT window. The pointer for the end of the LBT window may be indicated by an index relative to the starting slot or starting sub-slot of the LBT window. For example, the end of the LBT window may be indicated as a number of slots or sub-slots after the starting slot or sub-slot In some aspects, the UE may receive the configuration from the BS in a shared radio frequency band. The configuration may include a frequency domain resource allocation (FDRA) that indicates at least one frequency range in the shared radio frequency band. A shared radio frequency band may include a licensed radio frequency band and/or an unlicensed radio frequency band. The unlicensed radio frequency band may include a 2.4 GHz band, a 3.5 GHz band, a 5 GHz band, a 6 GHZ band, a 37 GHz band, an FR2 band, an FR2x band, a frequency band in the range of about 60 GHz to about 71 GHz, and/or other unlicensed frequency band. In some instances, the UE may receive the configuration from the BS in a licensed radio frequency band. In order to reduce signaling overhead in the wireless network, the configuration may not include parameters including new data indicator (NDI), hybrid automatic repeat request process identification (HARQ ID), the K1 offset between the DL slot where the data is scheduled on PDSCH and the UL slot where the HARQ ACK/NACK feedback for the scheduled PDSCH data, and PUCCH resource indicator (PRI).

In some aspects, the configuration may be based on a topology of a wireless network (e.g., wireless network 100 or 200) that includes at least the UE (e.g., the UE 115, the sidelink UE 215, or the UE 600)) and the BS (e.g., the BS 105 or the BS 700). The topology of the network may include information associated with the relative positions and/or absolute positions of the communication devices (e.g., the UEs and BSs) in the network. The BS may determine the topology of the network using any suitable method. For example, the BS may receive information from the UEs indicating their absolute position in the network. The UEs may determine their position based on a global navigation satellite system (GNSS) and transmit the position to the BS. In some aspects, the BS may use beamforming techniques, radio frequency triangulation, received signal strength indicators, and/or other suitable position determining methods to determine the network topology. The BS may generate LBT window configurations for multiple UEs in the network based on the relative positions of the UEs. For example, the BS may generate configurations with overlapping (e.g., common) resources for UEs that are separated by a distance by which the transmissions of the different UEs are unlikely to interfere with one another. In some aspects, the BS may generate configurations with non-overlapping (e.g., separate) resources for UEs that are in close proximity to each other such that their respective transmissions may interfere with one another.

In some aspects, the configuration includes a maximum COT duration. The maximum COT duration may extend past the end associated with the LBT window. The configuration may further indicate resources associated with the COT duration. In this regard, the configuration may include time/frequency resources signaled via a DCI3 message. The time resources may be indicated in a time domain resource allocation (TDRA). The frequency resources may be indicated in a frequency domain resource allocation (FDRA). The configuration may include a start and an end associated with the COT. For example, the configuration may include an indicator indicating a starting slot and/or sub-slot associated with the COT duration. The configuration may include an indicator indicating an ending slot and/or sub-slot associated with the COT duration. The start and end indicators of the COT duration may include slot indexes and/or sub-slot indexes.

At action 820, the method 800 includes a UE (e.g., the UE 115, the sidelink UE 215, or the UE 600) performing an LBT for a COT in a shared radio frequency band during the LBT window. In this regard, the UE may the perform the LBT for the COT in at least one frequency range in the shared radio frequency band. In some aspects, the at least one frequency range in the shared radio frequency band includes a plurality of contiguous frequencies in the shared radio frequency band. For example, the contiguous frequencies may include multiple subchannels that are contiguous over a range of frequencies. The configuration may include an indicator (e.g., a bitmap) indicating which frequencies the UE may perform the LBT in the shared radio frequency band. In some aspects, the BS may configure multiple UEs with the same and/or different frequency ranges to perform an LBT. In some aspects, the frequency ranges for each of the UEs may be contiguous. In some aspects, the frequency ranges for the UEs may be interleaved with one another. For example, a first UE may be configured with frequency ranges having even indexes and a second UE may be configured with frequency ranges having odd indexes. However, any type or arrangement of interleaving of frequencies may be utilized. In some aspects, the BS may configure (e.g., assign) overlapping time and/or frequency resources to multiple UEs. Each of the multiple UEs assigned with the overlapping time and/or frequency resources may compete for the COT by performing an LBT in the overlapping resources. In some instances, the BS may limit the number of UEs configured with overlapping resources in order to increase the probability of the UEs to gain access to the COT.

In some aspects, the UE may gain access to a wireless channel by performing the LBT. In some aspects, the UE may communicate over a shared radio frequency band (e.g., a licensed radio frequency band, a shared radio frequency band, an unlicensed radio frequency band). One issue of operating in a shared radio frequency band is to ensure coexistence with other systems (e.g., Wi-Fi). In some instances, the UE may operate in a manner that limits the impact on other devices operating in the same shared radio frequency band. For example, in some aspects, standards regulations may mandate the use of listen-before-talk (LBT) protocols. LBT is a radio frequency band sharing mechanism by which a device (e.g., a UE, a BS) senses the shared radio frequency band using a clear channel assessment (CCA) check before accessing the channel. The UE may first sense the communications channel during the LBT window to determine if there are other devices using the channel prior to any transmission by the UE. In some aspects, the channel sensing procedure may rely on detecting energy levels on one or multiple sub-bands of the shared radio frequency band.

Aspects of the LBT may be indicated by the configuration received from the BS. For example, LBT parameters indicated in the configuration may include the type of LBT (e.g., a frame-based equipment (1-BE)-based LBT and/or a load-based equipment (LBE)-based LBT), category of LBT (e.g., CAT2-LBT and/or CAT4-LBT), duration of sensing, CCA parameters, a back-off time period after an unsuccessful LBT, the LBT window size (e.g., the number of slots and/or sub-slots for the LBT window), a start and/or an end associated with the LBT window, the energy detection threshold, discovery reference signal timing, beam direction of LBT, etc. The LBT channel sensing may be performed any time during the LBT window. If the LBT is successful, then the UE may gain access to the wireless channel during the COT and may transmit a transport block. If the LBT is unsuccessful (e.g., the channel is sensed to be busy), the UE may wait for a time period (e.g., a predetermined time period and/or a random time period) and perform another LBT in the LBT window. The UE may perform multiple LBTs within the LBT window to gain the COT. In some aspects, the UE may perform a successful LBT by sensing the energy in the channel and determining the sensed energy is below a threshold. If the energy level in the channel is below the CCA threshold, then the UE may transmit for the maximum COT duration.

If the UE does not perform a successful LBT during the LBT window, the UE may transmit a message to the BS indicating the LBT was not successful and request another configuration for an additional LBT window. In response, the BS may transmit another configuration indicating, without limitation, the LBT window, the LBT parameters, and the COT duration. In order to reduce signaling overhead in the wireless network, the configuration may not include parameters including new data indicator (NDI), hybrid automatic repeat request process identification (HARQ ID), the K1 offset between the DL slot where the data is scheduled on PDSCH and the UL slot where the HARQ ACK/NACK feedback for the scheduled PDSCH data, and PUCCH resource indicator (PRI).

In some aspects, the configuration received by the UE from the BS may include at least one direction (e.g., a beam direction) associated with the LBT. In this regard, performing the LBT for the COT in the shared radio frequency band may include performing the LBT in one or more beam directions. A beam may be a beamformed signal that focuses signal energy in a specific beam direction towards an intended transmitter or receiver. A beamformed signal may allow multiple transmitters to transmit at the same time in different spatial directions without interfering with each other and/or with minimal interference. The specific beam direction(s) indicated in the configuration may be based on the network topology (e.g., the positions of the UE(s) and the BS(s)). The UE may perform the LBT in one or more beam direction(s) (e.g., 1, 2, 4, 8, 16, or more beam directions). In some instances, the beam direction(s) may be towards a target UE (e.g., another sidelink UE) that the UE intends to communicate with. The UE may configure its receiver to the specific beam direction and perform the LBT in the specific beam direction.

At action 830, the method 800 includes a UE (e.g., the UE 115, the sidelink UE 215, or the UE 600) transmitting, based on the LBT being successful, one or more transport blocks (TBs) to another sidelink UE during the COT. In this regard, the UE may transmit the TB(s) to another UE in a physical sidelink shared channel (PSSCH). The UE may transmit the TB(s) to another UE in at least one beam direction that has successfully cleared the LBT. In some aspects, the UE transmits the one or more TBs based on the configuration received from the BS. For example, the UE may transmit the one or more TBs based on a start and/or an end associated with the LBT window, a frequency domain resource allocation (FDRA) that indicates at least one frequency range in the shared radio frequency band, a topology of a wireless network (e.g., wireless network 100 or 200) that includes at least the (e.g., the UE 115, the sidelink UE 215, or the UE 600)) and the BS (e.g., the BS 105 or the BS 700), the type of LBT, and the COT duration. The UE may receive the configuration for the LBT window, perform a successful LBT in a shared frequency band before the end of the LBT window, and transmit a TB via a PSSCH to another UE during the COT duration (e.g., after the start of the COT duration and before the end of the COT duration).

In some aspects, the COT duration may be based on an amount of data the UE needs to transmit in TB(s). A larger amount of data may require a longer COT duration as compared to a smaller amount of data. The amount of data to be transmitted by the UE may be indicated to the BS by the UE. In some instances, the UE indicates the amount of data to be transmitted in a buffer status report (BSR). The UE may transmit the BSR to the BS. In response, the BS may transmit the configuration to the UE that includes a COT duration based on the BSR received from the UE.

FIG. 9 is a flow diagram of a communication method 800 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as the BS 105 or the BS 700, may utilize one or more components, such as the processor 702, the memory 704, the COT contention grant module 708, the transceiver 710, the modem 712, and the one or more antennas 716, to execute aspects of method 900. The method 900 may employ similar mechanisms as in the networks 100 and 200 and the aspects and actions described with respect to FIGS. 2-5. As illustrated, the method 900 includes a number of enumerated actions, but the method 900 may include additional actions before, after, and in between the enumerated actions. In some aspects, one or more of the enumerated actions may be omitted or performed in a different order.

At action 910, the method 900 includes a BS (e.g., the BS 105 or the BS 700) transmitting a configuration indicating an LBT window that indicates a start and an end associated with the LBT window and a channel occupancy time (COT) in a shared radio frequency band to a UE (e.g., the UE 115, the sidelink UE 215, or the UE 600). The configuration may indicate a start and/or an end associated with the LBT window. In this regard, the BS may transmit the configuration to the UE in a downlink control information (DCI) message. The UE may receive the configuration via a physical downlink control channel (PDCCH), a physical broadcast channel (PBCH), a physical downlink shared channel (PDSCH), or other suitable channel. The BS and the UE may operate in a sidelink mode 1 in which the UE is in communication with the BS in order to receive the configuration from the BS in the DCI message. The LBT window may be a time period in which the UE may perform an LBT to gain a channel occupancy time (COT) in which the UE may transmit data (e.g., transmit data in a transport block). As a result of the UE contending for the COT by performing one or more LBT(s) within an LBT window time period, the wireless network (e.g., wireless network 100, 200) may reduce control traffic and latency as compared to the UE reporting a HARQ process to the BS and requesting a DCI grant from the BS each time an LBT is performed unsuccessfully. In this regard, in some instances the BS may refrain from scheduling the transmission of each TB, thereby reducing network traffic, including reducing PUCCH communications.

In some aspects, the start associated with the LBT window may be indicated in the configuration by a pointer. The pointer for the start of the LBT window may be to a starting slot or a starting sub-slot. In some aspects, a slot may be partitioned into sub-slots. A sub-slot may include a number of symbols (e.g., contiguous symbols) within the slot. For example, a sub-slot may include 1, 2, 3, 4, 5, or more symbols within the slot.

The pointer for the start of the LBT window may be a slot index or a sub-slot index that indicates the starting slot or starting sub-slot of the LBT window. In some instances, pointer for the start of the LBT window may be indicated relative to a slot that includes the configuration. For example, the pointer for the start of the LBT window may be indicated by an index relative to a slot carrying a DCI message (e.g., a unicast DCI3 message and/or a groupcast DCI3 message) that includes the configuration.

In some aspects, the end associated with the LBT window may also be indicated in the configuration by a pointer. The pointer for the end of the LBT window may be to an ending slot or an ending sub-slot. The pointer for the end of the LBT window may be a slot index or sub-slot index that points to the ending slot or ending sub-slot of the LBT window. The pointer for the end of the LBT window may be indicated by an index relative to the starting slot or starting sub-slot of the LBT window. For example, the end of the LBT window may be indicated as a number of slots or sub-slots after the starting slot or sub-slot.

In some aspects, the BS may transmit the configuration to the UE in a shared radio frequency band. The configuration may include a frequency domain resource allocation (FDRA) that indicates at least one frequency range in the shared radio frequency band. A shared radio frequency band may include a licensed radio frequency band and/or an unlicensed radio frequency band. The unlicensed radio frequency band may include a 2.4 GHz band, a 3.5 GHz band, a 5 GHz band, a 6 GHZ band, a 37 GHz band, an FR2 band, an FR2x band, a frequency band in the range of about 60 GHz to about 71 GHz, and/or other unlicensed frequency band. In some instances, the BS may transmit the configuration to the UE in a licensed radio frequency band. In order to reduce signaling overhead in the wireless network, the configuration may not include parameters including new data indicator (NDI), hybrid automatic repeat request process identification (HARQ ID), the K1 offset between the DL slot where the data is scheduled on PDSCH and the UL slot where the HARQ ACK/NACK feedback for the scheduled PDSCH data, and PUCCH resource indicator (PRI).

In some aspects, the configuration may be based on a topology of a wireless network (e.g., wireless network 100 or 200) that includes at least the UE (e.g., the UE 115, the sidelink UE 215, or the UE 600)) and the BS (e.g., the BS 105 or the BS 700). The topology of the network may include information associated with the relative positions and/or absolute positions of the communication devices (e.g., the UEs and BSs) in the network. The BS may determine the topology of the network using any suitable method. For example, the BS may receive information from the UEs indicating their absolute position in the network. The UEs may determine their position based on a global navigation satellite system (GNSS) and transmit the position to the BS. In some aspects, the BS may use beamforming techniques, radio frequency triangulation, received signal strength indicators, and/or other suitable position determining methods to determine the network topology. The BS may generate LBT window configurations for multiple UEs in the network based on the relative positions of the UEs. For example, the BS may generate configurations with overlapping (e.g., common) resources for UEs that are separated by a distance by which the transmissions of the different UEs are unlikely to interfere with one another. In some aspects, the BS may generate configurations with non-overlapping (e.g., separate) resources for UEs that are in close proximity to each other such that their respective transmissions may interfere with one another.

In some aspects, the configuration includes a maximum COT duration. The maximum COT duration may extend past the end associated with the LBT window. The configuration may further indicate resources associated with the COT duration. In this regard, the configuration may include time/frequency resources signaled via a DCI3 message. The time resources may be indicated in a time domain resource allocation (TDRA). The frequency resources may be indicated in a frequency domain resource allocation (FDRA). The configuration may include a start and an end associated with the COT. For example, the configuration may include an indicator indicating a starting slot and/or sub-slot associated with the COT duration. The configuration may include an indicator indicating an ending slot and/or sub-slot associated with the COT duration. The start and end indicators of the COT duration may include slot indexes and/or sub-slot indexes.

The configuration may include an indicator (e.g., a bitmap) indicating which frequencies the UE may perform the LBT in the shared radio frequency band. In some aspects, the BS may configure multiple UEs with the same and/or different frequency ranges to perform an LBT. In some aspects, the frequency ranges for each of the UEs may be contiguous. In some aspects, the frequency ranges for the UEs may be interleaved with one another. For example, a first UE may be configured with frequency ranges having even indexes and a second UE may be configured with frequency ranges having odd indexes. However, any type or arrangement of interleaving of frequencies may be utilized. In some aspects, the BS may configure (e.g., assign) overlapping time and/or frequency resources to multiple UEs. Each of the multiple UEs assigned with the overlapping time and/or frequency resources may compete for the COT by performing an LBT in the overlapping resources. In some instances, the BS may limit the number of UEs configured with overlapping resources in order to increase the probability of the UEs to gain access to the COT.

In some aspects, the UE may gain access to a wireless channel by performing the LBT. In some aspects, the UE may communicate over a shared radio frequency band (e.g., a licensed radio frequency band, a shared radio frequency band, an unlicensed radio frequency band). One issue of operating in a shared radio frequency band is to ensure coexistence with other systems (e.g., Wi-Fi). In some instances, the UE may operate in a manner that limits the impact on other devices operating in the same shared radio frequency band. For example, in some aspects, standards regulations may mandate the use of listen-before-talk (LBT) protocols. LBT is a radio frequency band sharing mechanism by which a device (e.g., a UE, a BS) senses the shared radio frequency band using a clear channel assessment (CCA) check before accessing the channel. The UE may first sense the communications channel during the LBT window to determine if there are other devices using the channel prior to any transmission by the UE. In some aspects, the channel sensing procedure may rely on detecting energy levels on one or multiple sub-bands of the shared radio frequency band.

Aspects of the LBT may be indicated by the configuration transmitted by the BS. For example, LBT parameters indicated in the configuration may include the type of LBT (e.g., a frame-based equipment (FBE)-based LBT and/or a load-based equipment (LBE)-based LBT), category of LBT (e.g., CAT2-LBT and/or CAT4-LBT), duration of sensing, CCA parameters, a back-off time period after an unsuccessful LBT, the LBT window size (e.g., the number of slots and/or sub-slots for the LBT window), a start and/or an end associated with the LBT window, the energy detection threshold, discovery reference signal timing, beam direction of LBT, etc. The LBT channel sensing may be performed any time during the LBT window. If the LBT is successful, then the UE may gain access to the wireless channel during the COT and may transmit a transport block. If the LBT is unsuccessful (e.g., the channel is sensed to be busy), the UE may wait for a time period (e.g., a predetermined time period and/or a random time period) and perform another LBT in the LBT window. The UE may perform multiple LBTs within the LBT window to gain the COT. In some aspects, the UE may perform a successful LBT by sensing the energy in the channel and determining the sensed energy is below a threshold. If the energy level in the channel is below the CCA threshold, then the UE may transmit for up to the maximum COT duration.

If the UE does not perform a successful LBT during the LBT window, the BS may receive a message from the UE indicating the LBT was not successful. The message may include a request for another configuration including an additional LBT window. In response, the BS may transmit another configuration indicating, without limitation, the LBT window, the LBT parameters, and the COT duration. In order to reduce signaling overhead in the wireless network, the configuration may not include parameters including new data indicator (NDI), hybrid automatic repeat request process identification (HARQ ID), the K1 offset between the DL slot where the data is scheduled on PDSCH and the UL slot where the HARQ ACK/NACK feedback for the scheduled PDSCH data, and PUCCH resource indicator (PRI).

In some aspects, the configuration transmitted by the BS to the UE may include at least one direction (e.g., a beam direction) associated with the LBT. In this regard, the UE performing the LBT for the COT in the shared radio frequency band may include the UE performing the LBT in one or more beam directions. A beam may be a beamformed signal that focuses signal energy in a specific beam direction towards an intended transmitter or receiver. A beamformed signal may allow multiple transmitters to transmit at the same time in different spatial directions without interfering with each other and/or with minimal interference. The specific beam direction(s) indicated in the configuration may be based on the network topology (e.g., the positions of the UE(s) and the BS(s)). The UE may perform the LBT in one or more beam direction(s) (e.g., 1, 2, 4, 8, 16, or more beam directions). In some instances, the beam direction(s) may be towards a target UE (e.g., another sidelink UE) that the UE intends to communicate with. The UE may configure its receiver to the specific beam direction and perform the LBT in the specific beam direction.

The UE may transmit the TB(s) to another UE in a physical sidelink shared channel (PSSCH) based on a successful LBT. The UE may transmit the TB(s) to another UE in at least one beam direction that has successfully cleared the LBT. In some aspects, the UE transmits the one or more TBs based on the configuration transmitted by the BS to the UE. For example, the UE may transmit the one or more TBs based on a start and/or an end associated with the LBT window, a frequency domain resource allocation (FDRA) that indicates at least one frequency range in the shared radio frequency band, a topology of a wireless network (e.g., wireless network 100 or 200) that includes at least the (e.g., the UE 115, the sidelink UE 215, or the UE 600)) and the BS (e.g., the BS 105 or the BS 700), the type of LBT, and the COT duration. The UE may receive the configuration for the LBT window from the BS, perform a successful LBT in a shared frequency band before the end of the LBT window, and transmit a TB via a PSSCH to another UE during the COT duration (e.g., after the start of the COT duration and before the end of the COT duration).

In some aspects, the COT duration may be based on an amount of data the UE needs to transmit in TB(s). A larger amount of data may require a longer COT duration as compared to a smaller amount of data. The amount of data to be transmitted by the UE may be indicated to the BS by the UE. In some instances, the UE indicates the amount of data to be transmitted in a buffer status report (BSR). The BS may receive the BSR from the UE. In response, the BS may transmit the configuration to the UE that includes a COT duration based on the BSR received from the UE.

By way of non-limiting examples, the following aspects are included in the present disclosure.

Aspect 1 includes a method of wireless communication performed by a sidelink user equipment (UE), the method comprising receiving, from a base station (BS), a configuration indicating a listen-before-talk (LBT) window, wherein the configuration indicates a start and an end associated with the LBT window; performing, during the LBT window, an LBT for a channel occupancy time (COT) in a shared radio frequency band; and transmitting, to another sidelink UE, based on the LBT being successful, one or more transport blocks (TBs) during the COT.

Aspect 2 includes the method of aspect 1, wherein the LBT comprises a category four LBT.

Aspect 3 includes the method of any of aspects 1-2, wherein the configuration is based on a topology of a wireless network comprising at least the sidelink UE and the BS.

Aspect 4 includes the method of any of aspects 1-3, wherein the receiving the configuration comprises receiving the configuration in a licensed radio frequency band.

Aspect 5 includes the method of any of aspects 1-4, wherein the receiving the configuration comprises receiving the configuration in a downlink control information (DCI) message.

Aspect 6 includes the method of any of aspects 1-5, wherein the start associated with the LBT window is based on at least one of a first slot index or a first sub-slot index: and the end associated with the LBT window is based on at least one of a second slot index or a second sub-slot index.

Aspect 7 includes the method of any of aspects 1-6, wherein the configuration comprises a maximum COT duration; and the maximum COT duration extends past the end associated with the LBT window.

Aspect 8 includes the method of any of aspects 1-7, further comprising transmitting, to the BS based on the LBT being unsuccessful, a request for a second configuration indicating another LBT window.

Aspect 9 includes the method of any of aspects 1-8, wherein the configuration comprises a frequency domain resource allocation (FDRA) that indicates at least one frequency range in the shared radio frequency band; and the performing the LBT for the COT in the shared radio frequency band comprises performing the LBT in the at least one frequency range in the shared radio frequency band.

Aspect 10 includes the method of any of aspects 1-9, wherein the at least one frequency range in the shared radio frequency band comprises a first plurality of frequencies, wherein the first plurality of frequencies is interlaced with a second plurality of frequencies in the shared radio frequency band.

Aspect 11 includes the method of any of aspects 1-10 wherein the at least one frequency range in the shared radio frequency band comprises a plurality of contiguous frequencies in the shared radio frequency band.

Aspect 12 includes the method of any of aspects 1-11, wherein the configuration comprises at least one direction associated with the LBT; the performing the LBT for the COT in the shared radio frequency band comprises performing the LBT in the at least one direction; and the transmitting the one or more TBs during the COT comprises transmitting the one or more TBs in the at least one direction.

Aspect 13 includes the method of any of aspects 1-12, further comprising transmitting to the BS, a buffer status report, wherein the configuration comprises a COT duration based on the buffer status report.

Aspect 14 includes the method of any of aspects 1-13, wherein the configuration further indicates a start and an end associated with the COT; and the transmitting the one or more TBs during the COT comprises transmitting the one or more TBs after the start associated with the COT and before the end associated with the COT.

Aspect 15 includes a method of wireless communication performed by a base station (BS), the method comprising transmitting, to a user equipment (UE), a configuration indicating a listen-before-talk (LBT) window that indicates a start and an end associated with the LBT window; and a channel occupancy time (COT) in a shared radio frequency band.

Aspect 16 includes the method of aspect 15, wherein the configuration is based on a topology of a wireless network comprising at least the BS and the UE.

Aspect 17 includes the method of any of aspects 15-16, wherein the transmitting the configuration comprises transmitting the configuration in a licensed radio frequency band.

Aspect 18 includes the method of any of aspects 15-17, wherein the transmitting the configuration comprises transmitting the configuration in a downlink control information (DCI) message.

Aspect 19 includes the method of any of aspects 15-18, wherein the start associated with the LBT window is based on at least one of a first slot index or a first sub-slot index: and the end associated with the LBT window is based on at least one of a second slot index or a second sub-slot index.

Aspect 20 includes the method of any of aspects 15-19, wherein the COT comprises a maximum COT duration; and the maximum COT duration extends past the end associated with the LBT window.

Aspect 21 includes the method of any of aspects 15-20, wherein the configuration comprises a first frequency domain resource allocation (FDRA) indicating at least one frequency range in the shared radio frequency band.

Aspect 22 includes the method of any of aspects 15-21, further comprising transmitting, to at least one other UE, a second configuration different from the configuration, wherein the second configuration comprises a second FDRA indicating a second frequency range in the shared radio frequency band different from the at least one frequency range in the shared radio frequency band.

Aspect 23 includes the method of any of aspects 15-22, wherein the at least one frequency range comprises a first plurality of frequencies; and the first plurality of frequencies is interlaced with a second plurality of frequencies in the shared radio frequency band.

Aspect 24 includes the method of any of aspects 15-23, further comprising receiving, from the UE, a buffer status report, wherein the configuration further indicates a COT duration based on the buffer status report.

Aspect 25 includes the method of any of aspects 15-24, wherein the configuration comprises at least one direction associated with the LBT window.

Aspect 26 includes a user equipment (UE) comprising a transceiver, a memory, and a processor coupled to the transceiver and the memory, the sidelink UE configured to perform any one of aspects 1-14.

Aspect 27 includes a base station (BS) comprising a transceiver, a memory, and a processor coupled to the transceiver and the memory, the BS configured to perform any one of aspects 15-25.

Aspect 28 includes a non-transitory computer-readable medium storing one or more instructions for wireless communication, the one or more instructions comprising one or more instructions that, when executed by one or more processors of a sidelink user equipment, cause the one or more processors to perform any one of aspects 1-14.

Aspect 29 includes a non-transitory computer-readable medium storing one or more instructions for wireless communication, the one or more instructions comprising one or more instructions that, when executed by one or more processors of a base station, cause the one or more processors to perform any one of aspects 15-25.

Aspect 30 includes a sidelink user equipment comprising one or more means to perform any one or more of aspects 1-14.

Aspect 31 includes a base station comprising one or more means to perform any one or more of aspects 15-25.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
   transmitting to a base station (BS), a buffer status report (BSR) indicating an amount of data to be transmitted from the first sidelink UE to a second sidelink UE;
   receiving, from the BS, a configuration indicating a listen-before-talk (LBT) window for sidelink communications between the first sidelink UE and the second sidelink UE, wherein the configuration indicates a start and an end associated with the LBT window and a maximum channel occupancy time (COT) duration, wherein the maximum COT duration is based on the BSR;
   performing, during the LBT window, an LBT for a COT in a shared radio frequency band; and
   transmitting, to the second sidelink UE, based on the LBT being successful, one or more transport blocks (TBs) during the COT using the maximum COT duration.

2. The method of claim 1, wherein the configuration is based on a topology of a wireless network comprising at least the first sidelink UE and the BS.

3. The method of claim 1, wherein:
   the start associated with the LBT window is based on at least one of a first slot index or a first sub-slot index; and
   the end associated with the LBT window is based on at least one of a second slot index or a second sub-slot index.

4. The method of claim 1, wherein:
   the maximum COT duration extends past the end associated with the LBT window.

5. The method of claim 1, further comprising:
   transmitting, to the BS based on the LBT being unsuccessful, a request for a second configuration indicating another LBT window.

6. The method of claim 1,
   wherein the configuration further indicates frequency resources associated with the maximum COT duration.

7. The method of claim 1, wherein:
   the configuration further indicates a start and an end associated with the COT; and
   the transmitting the one or more TBs during the COT comprises transmitting the one or more TBs after the start associated with the COT and before the end associated with the COT.

8. A method of wireless communication performed by a base station (BS), the method comprising:
   receiving, from a first sidelink user equipment (UE), a buffer status report (BSR) indicating an amount of data to be transmitted from the first sidelink UE to a second sidelink UE;

transmitting, to the first sidelink UE, a configuration indicating:
  a listen-before-talk (LBT) window for sidelink communications between the first sidelink UE and the second sidelink UE, wherein the configuration indicates a start and an end associated with the LBT window and a maximum channel occupancy time (COT) duration for a COT, wherein the maximum COT duration is based on the BSR; and
  the COT in a shared radio frequency band for the sidelink communications.

9. The method of claim 8, wherein the configuration is based on a topology of a wireless network comprising at least the BS and the first sidelink UE.

10. The method of claim 8, wherein:
the start associated with the LBT window is based on at least one of a first slot index or a first sub-slot index; and
the end associated with the LBT window is based on at least one of a second slot index or a second sub-slot index.

11. The method of claim 8, wherein:
the maximum COT duration extends past the end associated with the LBT window.

12. The method of claim 8,
wherein the configuration further indicates frequency resources associated with the maximum COT duration.

13. A first user equipment (UE) comprising:
a transceiver, a memory, and a processor coupled to the transceiver and the memory, the first UE configured to:
  transmit to a base station (BS), a buffer status report (BSR) indicating an amount of data to be transmitted from the first UE to a second UE;
  receive, from the BS, a configuration indicating a listen-before-talk (LBT) window for sidelink communications between the first UE and the second UE, wherein the configuration indicates a start and an end associated with the LBT window and a maximum channel occupancy time (COT) duration, wherein the maximum COT duration is based on the BSR;
  perform, during the LBT window, an LBT for a COT in a shared radio frequency band; and
  transmit, to the second UE, based on the LBT being successful, one or more transport blocks (TBs) during the COT using the maximum COT duration.

14. The first UE of claim 13, wherein:
the LBT comprises a category four LBT.

15. The first UE of claim 13, wherein:
the configuration is based on a topology of a wireless network comprising at least the first UE and the BS.

16. The first UE of claim 13, wherein:
the maximum COT duration extends past the end associated with the LBT window.

17. The first UE of claim 13, wherein:
the first UE is further configured to receive the configuration in a licensed radio frequency band.

18. The first UE of claim 13, wherein:
the first UE is further configured to receive the configuration in a downlink control information (DCI) message.

19. The first UE of claim 13, wherein:
the configuration comprises a frequency domain resource allocation (FDRA) that indicates at least one frequency range in the shared radio frequency band; and
the first UE is further configured to perform the LBT in the at least one frequency range in the shared radio frequency band.

20. The first UE of claim 19, wherein:
the at least one frequency range in the shared radio frequency band comprises a first plurality of frequencies, wherein the first plurality of frequencies is interlaced with a second plurality of frequencies in the shared radio frequency band.

21. The first UE of claim 13, wherein:
the configuration comprises at least one beam direction associated with the LBT;
the first UE is further configured to perform the LBT in the at least one beam direction; and
the first UE is further configured to transmit the one or more TBs in the at least one beam direction.

22. The first UE of claim 13, wherein:
the start associated with the LBT window is based on at least one of a first slot index or a first sub-slot index; and
the end associated with the LBT window is based on at least one of a second slot index or a second sub-slot index.

23. The first UE of claim 13, wherein:
the first UE is further configured to transmit, to the BS based on the LBT being unsuccessful, a request for a second configuration indicating another LBT window.

24. The first UE of claim 13,
wherein the configuration further indicates frequency resources associated with the maximum COT duration.

25. A base station (BS) comprising:
a transceiver, a memory, and a processor coupled to the transceiver and the memory, the BS configured to:
  receive, from a first sidelink user equipment (UE), a buffer status report (BSR) indicating an amount of data to be transmitted from the first sidelink UE to a second sidelink UE;
  transmit, to a first sidelink UE, a configuration indicating:
    a listen-before-talk (LBT) window for sidelink communications between the first sidelink UE and the second sidelink UE, wherein the configuration indicates a start and an end associated with the LBT window and a maximum channel occupancy time (COT) duration for a COT, wherein the maximum COT duration is based on the BSR; and
    the COT in a shared radio frequency band for the sidelink communications.

26. The BS of claim 25, wherein the configuration is based on a topology of a wireless network comprising at least the BS and the first sidelink UE.

27. The BS of claim 25, wherein:
the start associated with the LBT window is based on at least one of a first slot index or a first sub-slot index; and
the end associated with the LBT window is based on at least one of a second slot index or a second sub-slot index.

28. The BS of claim 25, wherein:
the maximum COT duration extends past the end associated with the LBT window.

29. The BS of claim 25, wherein the configuration comprises a first frequency domain resource allocation (FDRA) indicating at least one frequency range in the shared radio frequency band.

30. The BS of claim 25,
wherein the configuration further indicates frequency resources associated with the maximum COT duration.

* * * * *